United States Patent
Evevsky

(10) Patent No.: US 8,668,144 B2
(45) Date of Patent: Mar. 11, 2014

(54) METHOD AND PROCESS FOR SYMBOLIC MARK DECODING

(75) Inventor: Nick Evevsky, Webster, NY (US)

(73) Assignee: Ricoh Company, Ltd., Tokyo (JP)

( * ) Notice: Subject to any disclaimer, the term of this patent is extended or adjusted under 35 U.S.C. 154(b) by 124 days.

(21) Appl. No.: 13/209,088

(22) Filed: Aug. 12, 2011

(65) Prior Publication Data

US 2013/0037608 A1 Feb. 14, 2013

(51) Int. Cl.
*G06K 5/00* (2006.01)

(52) U.S. Cl.
USPC ....... 235/380; 235/462.01; 235/435; 235/382

(58) Field of Classification Search
USPC ........................ 235/462.01, 462.46
See application file for complete search history.

(56) References Cited

U.S. PATENT DOCUMENTS

| | | | |
|---|---|---|---|
| 2005/0011958 A1 * | 1/2005 | Fukasawa et al. | 235/462.46 |
| 2008/0201576 A1 | 8/2008 | Kitagawa et al. | |
| 2009/0234722 A1 | 9/2009 | Evevsky | |
| 2009/0244638 A1 | 10/2009 | Evevsky | |
| 2009/0285118 A1 * | 11/2009 | Yoshikawa et al. | 370/254 |
| 2009/0313060 A1 | 12/2009 | Evevsky | |
| 2010/0025470 A1 * | 2/2010 | Nakagawa et al. | 235/462.01 |
| 2010/0070759 A1 | 3/2010 | Leon Cobos et al. | |
| 2010/0266163 A1 | 10/2010 | Evevsky et al. | |
| 2010/0327066 A1 * | 12/2010 | Khan | 235/462.01 |
| 2011/0025842 A1 | 2/2011 | King et al. | |
| 2011/0029443 A1 | 2/2011 | King et al. | |
| 2012/0163269 A1 * | 6/2012 | Shuster et al. | 370/312 |

* cited by examiner

*Primary Examiner* — Sonji Johnson
(74) *Attorney, Agent, or Firm* — Cooper & Dunham LLP

(57) ABSTRACT

Apparatuses, systems and methods that operate to customize content or other information indicated by symbolic marks (such as, for example, QR codes and other types of barcodes).

20 Claims, 27 Drawing Sheets

| Role–Specific Destination Information | | | | | |
|---|---|---|---|---|---|
| Barcode Data | User Roles | | | | |
| | User Role 1 | User Role 2 | User Role 3 | User Role 4 | User Role 5 |
| xyz.com/000 | xyz.com/100 | xyz.com/200 | xyz.com/300 | xyz.com/400 | xyz.com/500 |
| xyz.com/001 | xyz.com/101 | xyz.com/201 | xyz.com/301 | xyz.com/401 | xyz.com/501 |
| xyz.com/002 | xyz.com/102 | xyz.com/202 | xyz.com/302 | xyz.com/402 | xyz.com/502 |
| xyz.com/003 | xyz.com/103 | xyz.com/203 | xyz.com/303 | xyz.com/403 | xyz.com/503 |
| xyz.com/004 | xyz.com/104 | xyz.com/204 | xyz.com/304 | xyz.com/404 | xyz.com/504 |
| xyz.com/005 | xyz.com/105 | xyz.com/205 | xyz.com/305 | xyz.com/405 | xyz.com/505 |

Fig. 3

| User Authentication Information ||
|---|---|
| Username | Password |
| John Smith | Abc1 |
| Jane Doe | Yxz67 |
| Jim Oscar | Jkl199 |
| ... | ... |
| ... | ... |
| ... | ... |

Fig. 11

USER DESTINATION INFORMATION

| Barcode Data | User | | |
|---|---|---|---|
| | John Smith | Jane Doe | Jim Oscar |
| "XYZ Corporation Shirt Products" | www.xyz.com/mens/shirts | www.xyz.com/womens/shirts | www.xyz.com/kids/shirts |
| "ABC Corporation Hat Products" | www.abc.com/hats/john.smith | www.abc.com/hats/jane.doe | www.abc.com/hats/jim.oscar |
| "MNO Corporation Belt Products" | www.mno.com/1957z | www.mno.com/d8g5c6 | www.mno.com/12dvbpo |
| ⋮ | ⋮ | ⋮ | ⋮ |
| ⋮ | ⋮ | ⋮ | ⋮ |

Fig. 14

| User Role Information ||
|---|---|
| Username | Role |
| John Smith | 1 |
| Jane Doe | 2 |
| Jim Oscar | 3, 4 |
| ... | ... |
| ... | ... |
| ... | ... |

Fig. 15

| Role Definition Information | |
|---|---|
| Role | Definition |
| 1 | Basic User |
| 2 | Preferred User<br>-Special pricing or promotions for specific items<br>-Product info such as care instructions<br>-Feedback from other users<br>-Request for associate help at specific item location |
| 3 | Sales Person User<br>-Pricing History<br>-A/V training information on how to best sell item<br>-List of popular sell up items |
| 4 | Stock Person User<br>-No. of items from inventory system<br>-No. of items in other stores or in transit |
| 5 | Manager<br>-Access to all other roles<br>-Access to management specific dashboard<br>-Access to store analytics |

Fig. 16

| Barcode Data | Role-Specific Destination Information | | | | |
|---|---|---|---|---|---|
| | User Roles | | | | |
| | User Role 1 | User Role 2 | User Role 3 | User Role 4 | User Role 5 |
| xyz.com/000 | xyz.com/100 | xyz.com/200 | xyz.com/300 | xyz.com/400 | xyz.com/500 |
| xyz.com/001 | xyz.com/101 | xyz.com/201 | xyz.com/301 | xyz.com/401 | xyz.com/501 |
| xyz.com/002 | xyz.com/102 | xyz.com/202 | xyz.com/302 | xyz.com/402 | xyz.com/502 |
| xyz.com/003 | xyz.com/103 | xyz.com/203 | xyz.com/303 | xyz.com/403 | xyz.com/503 |
| xyz.com/004 | xyz.com/104 | xyz.com/204 | xyz.com/304 | xyz.com/404 | xyz.com/504 |
| xyz.com/005 | xyz.com/105 | xyz.com/205 | xyz.com/305 | xyz.com/405 | xyz.com/505 |

Fig. 19

USER DESTINATION INFORMATION

| Barcode Data | User | | | | |
|---|---|---|---|---|---|
| | John Smith | | | Jane Doe | Jim Oscar |
| | Morning | Afternoon | Evening | | |
| "XYZ Corporation Shirt Products" | www.xyz.com /mens/shirts/morning | www.xyz.com /mens/shirts/afternoon | www.xyz.com /mens/shirts/evening | www.xyz.com /womens/shirts | www.xyz.com /kids/shirts |
| "ABC Corporation Hat Products" | www.abc.com /hats/john.smith/ morning | www.abc.com /hats/john.smith /afternoon | www.abc.com /hats/john.smith /evening | www.abc.com /hats/jane.doe | www.abc.com /hats/jim.oscar |
| "MNO Corporation Belt Products" | www.mno.com /1957z/morning | www.mno.com /1957z/afternoon | www.mno.com /1957z/evening | www.mno.com /d8g5c6 | www.mno.com /12dvbpo |

Fig. 20

| Barcode Data | Role-Specific Destination Information ||||||
|---|---|---|---|---|---|---|
| | User Roles ||||||
| | User Role 1 | User Role 2 | User Role 3 | User Role 4 ||| User Role 5 |
| | | | | Shift 1 | Shift 2 | Shift 3 | |
| xyz.com/000 | xyz.com/100 | xyz.com/200 | xyz.com/300 | xyz.com/400/shift1 | xyz.com/400/shift2 | xyz.com/400/shift3 | xyz.com/500 |
| xyz.com/001 | xyz.com/101 | xyz.com/201 | xyz.com/301 | xyz.com/401/shift1 | xyz.com/401/shift2 | xyz.com/401/shift3 | xyz.com/501 |
| xyz.com/002 | xyz.com/102 | xyz.com/202 | xyz.com/302 | xyz.com/402/shift1 | xyz.com/402/shift2 | xyz.com/402/shift3 | xyz.com/502 |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

Fig. 21

| Barcode Data | TEMPORAL DESTINATION INFORMATION | | |
|---|---|---|---|
| | Time Period | | |
| | Morning | Afternoon | Evening |
| "XYZ Corporation Shirt Products" | www.xyz.com /mens/shirts/morning | www.xyz.com /mens/shirts/afternoon | www.xyz.com /mens/shirts/evening |
| "ABC Corporation Hat Products" | www.abc.com /hats/morning | www.abc.com /hats/afternoon | www.abc.com /hats/evening |
| "MNO Corporation Belt Products" | www.mno.com /morning | www.mno.com /afternoon | www.mno.com /evening |

Fig. 23

USER DESTINATION INFORMATION

| Barcode Data | User | | | | |
|---|---|---|---|---|---|
| | John Smith | | | Jane Doe | Jim Oscar |
| | Midtown Store | Downtown Store | Suburban Store | | |
| "XYZ Corporation Shirt Products" | www.xyz.com /mens/shirts/midtown | www.xyz.com /mens/shirts/downtown | www.xyz.com /mens/shirts/suburban | www.xyz.com /womens/shirts | www.xyz.com /kids/shirts |
| "ABC Corporation Hat Products" | www.abc.com /hats/john.smith /midtown | www.abc.com /hats/john.smith /downtown | www.abc.com /hats/john.smith /suburban | www.abc.com /hats/jane.doe | www.abc.com /hats/jim.oscar |
| "MNO Corporation Belt Products" | www.mno.com /1957z/midtown | www.mno.com /1957z/downtown | www.mno.com /1957z/suburban | www.mno.com /d8g5c6 | www.mno.com /12dvbpo |

Fig. 24

| Barcode Data | Role-Specific Destination Information ||||||
| --- | --- | --- | --- | --- | --- | --- |
| | User Roles ||||||
| | User Role 1 | User Role 2 | User Role 3 | User Role 4 ||| User Role 5 |
| | | | | City A, Country 1 | City B, Country 1 | City M, Country 2 | |
| xyz.com/000 | xyz.com/100 | xyz.com/200 | xyz.com/300 | xyz.com/400 /cityAcountry1 | xyz.com/400 /cityBcountry1 | xyz.com/400 /cityMcountry2 | xyz.com/500 |
| xyz.com/001 | xyz.com/101 | xyz.com/201 | xyz.com/301 | xyz.com/401 /cityAcountry1 | xyz.com/401 /cityBcountry1 | xyz.com/401 /cityMcountry2 | xyz.com/501 |
| xyz.com/002 | xyz.com/102 | xyz.com/202 | xyz.com/302 | xyz.com/402 /cityAcountry1 | xyz.com/402 /cityBcountry1 | xyz.com/402 /cityMcountry2 | xyz.com/502 |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

Fig. 25

| Barcode Data | LOCATION DESTINATION INFORMATION |||
|---|---|---|---|
| | Location |||
| | Midtown Store | Downtown Store | Suburban Store |
| "XYZ Corporation Shirt Products" | www.xyz.com /mens/shirts/midtown | www.xyz.com /mens/shirts/downtown | www.xyz.com /mens/shirts/suburban |
| "ABC Corporation Hat Products" | www.abc.com /hats/midtown | www.abc.com /hats/downtown | www.abc.com /hats/suburban |
| "MNO Corporation Belt Products" | www.mno.com /midtown | www.mno.com /downtown | www.mno.com /suburban |

METHOD AND PROCESS FOR SYMBOLIC MARK DECODING

TECHNICAL FIELD

This disclosure relates to tools (systems, apparatuses, methodologies, computer program products, etc.) for decoding information encoded by symbolic marks including, for example, QR codes and other types of barcodes.

BACKGROUND

In the current information age, information technology (IT) tools are extensively used in enterprises and other organizations in order to facilitate processing of documents and data.

In particular, symbolic marks that encode data, such as QR codes and other types of barcodes, may be used as a mechanism to retrieve useful information. The data encoded into such marks may be recovered with any of various IT tools, such as, for example, a computer terminal, smartphone, scanner or other apparatus. For example, a device may receive image data corresponding to the mark, and decode the information encoded by the mark.

There is a drawback, however, in that the data encoded in symbolic marks is static and is the same regardless of which device or which user attempts to decode the information.

There exists a need for an improved system that employs use of marks to dynamically access content or other information that is specific to the user, accessing terminal, etc.

SUMMARY

In an aspect of this disclosure, there is provided a tool (for example, an apparatus, application software, etc.) for decoding marks (such as, for example, barcodes, QR codes, other multi-dimensional codes, etc.) and processing the data encoded in the mark by taking into account an identity and/or role of a user. The data of the mark is processed, based on the identity of a user of the tool, in order to generate a content identifier or locator, such as a destination URL (uniform resource locator), that is specifically tailored to the identity or role of the user. As used herein, the term 'barcode' refers to an optical machine-readable representation of data. The data encoded in the barcode is referred to in this disclosure as 'barcode data'.

In another aspect, the content identifier may correspond to (in addition or instead of a destination URL) an email address, phone number, an SMS/text address or number, video data, coupon information, a Facebook™ page, contact information, a calendar entry, text or string information, directions, or some other content or identifier of content.

In another aspect, user authentication information corresponding to a specific user of the apparatus is received, and the identity or role of the user is determined, based on the authentication information. For example, the user authentication information may be supplied by the user at the time of access, or may be registered by the terminal and automatically supplied by the terminal when the user operates the terminal.

In another aspect, image data is obtained from optically scanning the mark, and the image data is processed along with the user authentication information, in order to generate the aforementioned content identifier (e.g. a destination URL), and such content locator or identifier is utilized to retrieve automatically content or other information tailored to the user into a browser.

In another aspect, the data encoded into a mark (such as a barcode or QR code) includes a generic URL, wherein the generic URL may direct a user to a generic, public website (of an enterprise or organization, for example) having generic, publically accessible content. Moreover, the destination URL is generated by modifying the aforementioned generic URL encoded in the mark, based on the user authentication information, and the modified URL may direct a user to a personalized and/or modified version of the generic website, the personalized and/or modified version of the website having content or other information tailored to the user.

In another aspect, user destination information lists many different types of data that may be encoded into a mark. Moreover, the user destination information may list, for each of the types of encoded data, a different destination URL corresponding to each user of the apparatus. That is, the user destination information lists, for each type of encoded data and each different user, a destination URL directed to content tailored to the user. Thus, if a first user optically scans the mark of a given product, the user destination information indicates a first destination URL tailored to the first user, whereas if a second user optically scans the same mark of the same product, the user destination information indicates a second destination URL tailored to the second user (which may be different from the first destination URL tailored to the first user).

In another aspect, user role information identifies a plurality of users, and a corresponding plurality of user roles in a system. For example, an enterprise or store may provide user role information indicating users that are basic customers, which users are preferred customers, which users are sales persons, which users are managers, etc.

In another aspect, data encoded in marks, such as QR codes and other types of barcodes, is processed based on a role of a user. For example, once the identity of a user is determined based on authentication or login information, the role of the user may be determined based on the aforementioned user role information. Thereafter, if the user role of the user is a preferred customer, for example, then the data encoded in the mark may be decoded and processed in order to generate a destination URL with content and features specifically tailored to a preferred customer (rather than a basic user). As another example, if the user role of the user is a manager, then the data encoded in the same mark may be decoded and processed in order to generate a destination URL with content and features specifically tailored to a manager.

In another aspect, information encoded in marks, such as QR codes and other types of barcodes, may be processed based on a current location of the user of the aforementioned tool (e.g. an apparatus), or a location of the tool (e.g. apparatus) itself. For example, if the current geographic location of the user or apparatus is in a particular city, state or country, etc., then information encoded in the mark may be processed in order to generate a destination URL directed to content specifically tailored to that city, state or country, etc. As another example, if the current location of the user or apparatus is in a first particular branch of a retail store chain, then information encoded in the mark may be processed in order to generate a destination URL specifically tailored to the first branch, whereas if the current location of the user or apparatus is in a second particular branch of that same retail store chain, then information encoded in the same mark may be processed in order to generate a destination URL specifically tailored to the second branch. Thus, if two copies of the same product having the same barcode information are located at two different places, the information obtained from scanning the barcode of each product may be different, based on the location of the product (or the location of the user that scans the barcode of the product).

In another aspect, information encoded in the marks may be processed based on a current time of the day, a current work shift period, or some other temporal or scheduling property. For example, if the current time is during a morning period, then information encoded in the mark may be processed in order to generate a destination URL directed to content specifically tailored to a morning time period. As another example, if the current work shift period is a dinner time work shift period, then information encoded in the mark may be processed in order to generate a destination URL directed to work-related information specifically tailored to a dinner time work shift period.

BRIEF DESCRIPTION OF THE DRAWINGS

The aforementioned and other aspects, features and advantages can be more readily understood from the following detailed description with reference to the accompanying drawings wherein:

FIG. 3 illustrates an example of a table registering user authentication information received by an apparatus, such as apparatus 10 depicted in FIG. 1;

FIG. 11 illustrates an example of a table registering user destination information accessed by an apparatus, such as apparatus 10 depicted in FIG. 1;

FIG. 14 illustrates an example of a table registering user role information accessed by an apparatus, such as apparatus 10 depicted in FIG. 1;

FIG. 15 illustrates an example of a table registering role definition information accessed by an apparatus, such as apparatus 10 depicted in FIG. 1;

FIG. 16 illustrates an example of role-specific destination information accessed by an apparatus, such as apparatus 10 depicted in FIG. 1;

FIG. 19 illustrates an example of a table registering user destination information accessed by an apparatus, such as apparatus 10 depicted in FIG. 1, according to an exemplary embodiment;

FIG. 20 illustrates an example of role-specific destination information accessed by an apparatus, such as apparatus 10 depicted in FIG. 1, according to an exemplary embodiment;

FIG. 21 illustrates an example of temporal destination information accessed by an apparatus, such as apparatus 10 depicted in FIG. 1, according to an exemplary embodiment;

FIG. 23 illustrates an example of a table registering user destination information accessed by an apparatus, such as apparatus 10 depicted in FIG. 1, according to an exemplary embodiment;

FIG. 24 illustrates an example of role-specific destination information accessed by an apparatus, such as apparatus 10 depicted in FIG. 1, according to an exemplary embodiment;

FIG. 25 illustrates an example of location destination information accessed by an apparatus, such as apparatus 10 depicted in FIG. 1, according to an exemplary embodiment.

DETAILED DESCRIPTION

Figure 1:
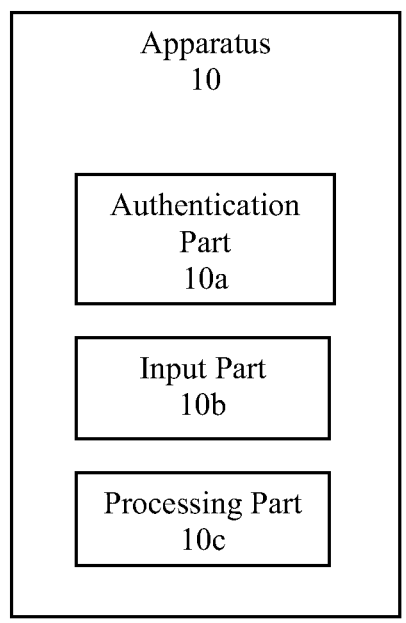
FIG. 1 shows a block diagram of an apparatus for decoding marks, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, there is described tools (systems, apparatuses, methodologies, computer program products, etc.) for decoding symbolic marks including, for example, QR codes and other types of barcodes.

For example, FIG. 1 shows schematically an apparatus 100 for decoding and/or processing encoded in symbolic marks including, for example, QR codes and other types of barcodes, according to an exemplary embodiment. As illustrated in FIG. 1, the apparatus 10 includes an authentication part 10a, an input part 10b, and a processing part 10c. However, it is possible that one or more of the aforementioned parts are external to the apparatus 10.

Figure 2:
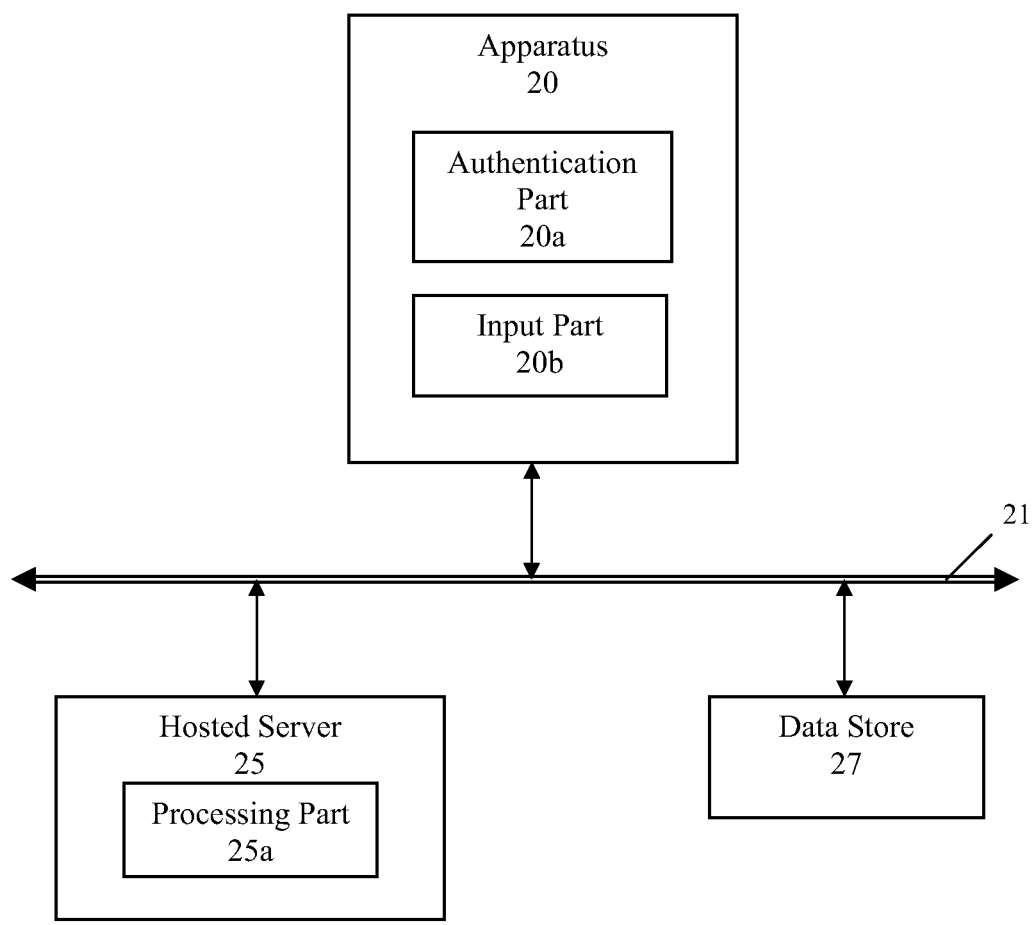
FIG. 2 shows a block diagram of a system for decoding marks, according to an exemplary embodiment.

For instance, FIG. 2 shows schematically a system 200 for decoding and/or processing information encoded in marks including, for example, QR codes and other types of barcodes, according to an exemplary embodiment. System 200 includes an apparatus 20 that is connected to the network 21.

The apparatus 20 depicted in FIG. 2 is similar to the apparatus 10 depicted in FIG. 1, and apparatus 20 includes an authentication part 20a and an input part 20b. A hosted server 25 is connected to the network 21, and includes a processing part 25a that may correspond functionally and structurally to the processing part 10c of the apparatus 10 depicted in FIG. 1, the functionality of which is described in more detail below. (Thus, any description of the processing part 10c in this disclosure may also refer to the processing part 25a). The system 200 also includes a data store 27 connected to the network 21.

Referring back to FIG. 1, the authentication part 10a is configured to receive user authentication information corresponding to a specific user of the apparatus 10, and to authenticate the user authentication information corresponding to the specific user, and thus identify the specific user.

For example, when a specific user such as "John Smith" is using the apparatus 10, the user may utilize an input part (e.g. keyboard or keys) or user interface part (e.g. touchscreen or monitor) of the apparatus to log into the apparatus and input user authentication information corresponding to that user. Although such an input part or user interface part of the apparatus 10 is not illustrated in FIG. 1, such a part may correspond to the keyboard 65 of the computer 600 illustrated in FIG. 6, or the control panel 79 of the multi-function device 700 illustrated in FIG. 7, where either device 600 or 700 may be used to implement the functionality of the apparatus 10, as described in greater detail below.

The user authentication information may be any information transmitted by a user to the apparatus 10 for the purposes of login and authentication, such as a username and password. FIG. 3 illustrates an example of user authentication information. As seen in FIG. 3, the user authentication information may include a plurality of user names corresponding to users of the apparatus 10, such as "John Smith", "Jane Doe" and "Jim Oscar", and a plurality of passwords corresponding to each of the users and user names. For example, the password corresponding to the username "John Smith" is "Abc1", the password corresponding to the username "Jane Doe" is "Yxz67", and the password corresponding to the username "Jim Oscar" is "Jk1199".

User authentication information is not limited to usernames and passwords, but may also include information such as email addresses, screen names, telephone numbers, facsimile numbers, and biometric information (fingerprints, palm prints, voice or speech, retinas or irises, facial expressions or features, signature, etc.).

Figure 4A:
FIG. 4A illustrates an example of a one-dimensional barcode.
Figure 4B:
FIG. 4B illustrates an example of a two-dimensional barcode.

The input part 10b is configured to receive image data of a barcode. As used herein, the term 'barcode' refers to an optical machine-readable representation of data. The data encoded in the barcode is referred to in this disclosure as 'barcode data'. For example, a common type of barcode includes a linear barcode, also referred to as a one-dimensional barcode, wherein such a barcode represents information by varying the width, height and/or spacing of a plurality of parallel lines. FIG. 4A illustrates an example of a linear, one-dimensional barcode. Another common type of barcode includes matrix barcode, also referred to as a two-dimensional barcode, wherein such a barcode represents information using rectangles, dots, hexagons and other geometric patterns in 2 dimensions. A popular type of matrix barcode is a QR code, an example of which is illustrated in FIG. 4B.

Barcodes are often attached to the exterior and/or packaging of various products and items in order to represent information pertaining to that product or item. The information represented by a barcode may include, for example, the manufacturer of the barcode, the type of the product, the model of the product, the identity of the product, the serial number of the product, etc. Note that the barcode data encoded in each of the barcodes illustrated in FIGS. 4A and 4B represents the text information "http://www.ricoh.com." The barcodes may be scanned and read by special optical scanners called barcode readers, although scanners, cameras and interpretive software are available on devices including desktop printers and smartphones. Thus, the apparatus 10 or 20 may receive the image data of the barcode as an electronic data transmission via a network (such as network 21 illustrated in FIG. 2). Alternatively, the apparatus 10 may include a barcode reader or special optical scanner, or may include a scanner, camera and/or interpretive software to read the barcode. The technology relating to barcodes and the different types of barcodes are well understood by those skilled in the art, and will not be discussed in further detail herein in order to avoid occluding the aspects of this disclosure.

After the input part 10a receives the image data of the barcode, the image data is passed to the processing part 10c of FIG. 1 (or processing part 25a of FIG. 2), and the processing part processes the image data of the barcode in order to decode barcode data encoded in the barcode. For example, if the processing part were to receive image data corresponding to the QR code illustrated in FIG. 4B, the processing part would process the image data of the barcode and decode the barcode data stored therein as the text information "http://www.ricoh.com." As described above, the technology relating to barcodes and the different types of barcodes are well understood by those skilled in the art, and will not be discussed in further detail herein in order to avoid occluding the aspects of this disclosure.

According to this exemplary embodiment, the processing part 10c is also configured to generate a content identifier/locator, such as a URL—referred to hereinafter as a 'destination URL'—by processing the barcode data based on the identity or user authentication information corresponding to the specific user of the apparatus. Note that, as described above, the user authentication information corresponding to the specific user of the apparatus is received and authenticated by the authentication part 10a, in order to identify the specific user.

Put another way, according to this exemplary embodiment, after the processing part decodes the barcode data encoded in the barcode, the processing part utilizes both the barcode data and the identity of the user in order to generate the content identifier/locator, such as the destination URL.

Figure 5:
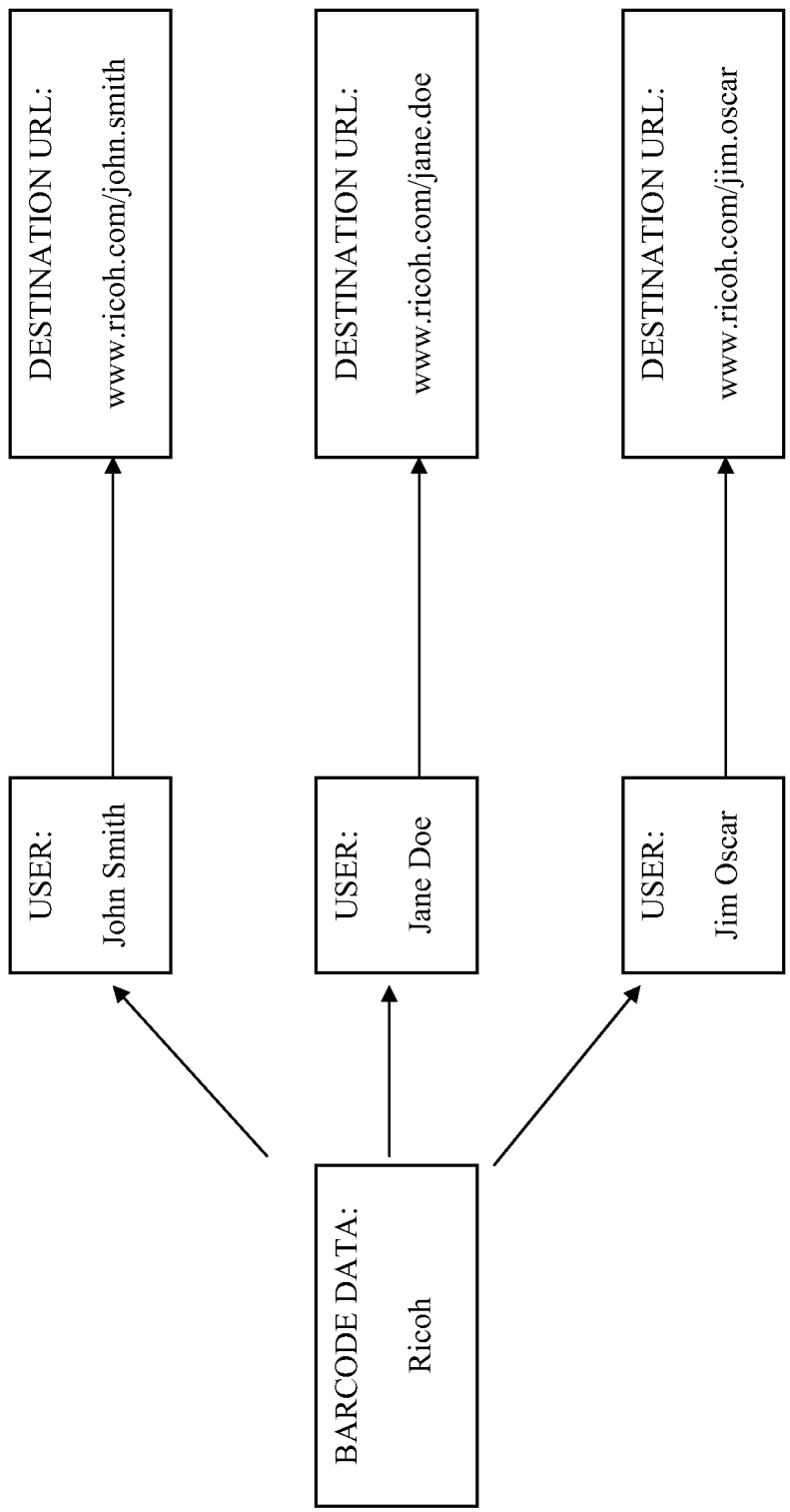
FIG. 5 illustrates an example of a procedure in which data of marks is processed to produce destination URLs specific to different users.

FIG. 5 illustrates a simple example of the aforementioned aspects of this embodiment. As illustrated in FIG. 5, the barcode data encoded in the barcode represents the textual information "Ricoh". Moreover, if the current user of the apparatus is John Smith (having a username "John Smith" as seen in the user identification information of FIG. 3), then based on the barcode data of "Ricoh" and the user name of "John Smith", the processing part 10c generates the destination URL www.ricoh.com/john.smith, as seen in FIG. 5. This destination URL clearly takes into account both the barcode information encoded in the barcode and the identity of a specific user of the apparatus.

On the other hand, if the current user of the apparatus is Jane Doe (having a username "Jane Doe" as seen in the user identification information of FIG. 3), then based on the barcode data of "Ricoh" and the user name of "Jane Doe", the processing part 10c generates the destination URL www.ricoh.com/jane.doe, as seen in FIG. 5. Further, if the current user of the apparatus is Jim Oscar (having a username "Jim Oscar" as seen in the user identification information of FIG. 3), then based on the barcode data of "Ricoh" and the user name of "Jim Oscar", the processing part 10c generates the destination URL www.ricoh.com/jim.oscar, as seen in FIG. 5.

In the example of FIG. 5 described above, the processing part of the apparatus generates the destination URL by placing "www." before the textual information included in the barcode data, and ".com" after the textual information included in the barcode data, and further attaches the forward slash symbol "/" followed by the username, with a period symbol "." between the first and last name of the username. However, this basic example is merely illustrative, and many variations can be introduced without departing from the spirit of the disclosure or from the scope of the appended claims. That is, the aspects of this exemplary embodiment incorporate any situation in which barcode data encoded in a barcode is processed, based on other information (such as an identity of a user of an apparatus), in order to generate different destination URLs (for different users, for example).

While the examples described above refer to the generation of a content identifier corresponding to a destination URL, it should be understood the that barcode data encoded in the barcode may include various other types of information, and that the processing part may utilize both the barcode data and the identity of the user in order to generate different types of content and/or content identifiers. For example, instead of generating a destination URL, the processing part may process the barcode data based on an identity of the user to generate an email address, a phone number, an SMS/text address or number, video data, coupon information, a Facebook™ page, contact information, a calendar entry, text or string information, directions, or some other content or identifier of content that is generated based on the barcode data and is specifically tailored to the identity of the user.

After the content identifier is generated, the processing part 10c may utilize the content identifier in any number of different ways. For example, if the content identifier is the aforementioned destination URL, the processing part 10c may automatically input the destination URL into a browser. The browser may be a program application or software application (such as Internet Explorer™, Netscape Navigator™, Apple Safari™, Google Chrome™, a proprietary browser, etc.) provided on the apparatus 10 so that a user of the apparatus can use browsing operations to access website corresponding to the destination URL. The browser may be displayed on a user interface part or display part of the apparatus 10. For example, the browser may be displayed on the display 64 of the computer 600 illustrated in FIG. 6, which may be utilized to provide the functionality of the apparatus 10. As another example, the browser may be displayed on the control panel 79 of the multi-function device 700 illustrated in FIG. 7, which may be utilized to provide the functionality of the apparatus 10.

If the content generated by the processing part is not a destination URL, the processing part may perform various other functions based on the generated content. For example, if the generated content is an email address, the processing part may generate a draft email directed to the email address and/or send an email to the email address. If the generated content is a phone number, the processing part my enter the phone number into a phone device or voice/phone application. If the generated content is an SMS/text address or number, the processing part may enter the SMS/text address or number into an SMS/text device or application. If the generated content is video data, the processing part may cause the video data to be played in a video player application. If the generated content is coupon information, the processing part may cause the coupon information to be displayed in a browser or word processing application, or to be printed. If the generated content is a Facebook™ page, the processing part may load the page into a web browser. If the generated content is contact information, the processing part may enter the contact information into a phone contact list stored on the device. If the generated content is a calendar entry, the processing part may enter the calendar entry into a calendar and scheduling application. If the generated content is text or string information, the text may be displayed in a web browser or word processing application. If the generated content is direction information, the directions may be loaded into a network-based mapping application operating on the apparatus, in order to provide the user with real-time directions to a place of interest. The aforementioned examples are illustrative, and many variations can be introduced on these examples without departing from the spirit of the disclosure or from the scope of the appended claims. For example, elements and/or features of different examples and illustrative embodiments may be combined with each other and/or substituted for each other within the scope of this disclosure and appended claims.

Thus, in this exemplary embodiment, the processing of barcode data that is encoded in a barcode takes into account other information in addition to the barcode data itself, such as the identity and/or user authentication information of a user of an apparatus. That is, even though the barcode data encoded in the barcode represents only one piece of information, through the aspects of this disclosure the processing of the barcode data can generate different resulting information (like a destination URL) depending on a user of the apparatus. Thus, it is possible to attain an improved system that employs use of marks to dynamically access content or other information, especially if the aspects of this disclosure are implemented on a widespread basis (e.g. by different businesses).

The apparatuses 10 and 20 and hosted server 25 of this disclosure may be realized by a computer program product including a computer-usable, non-transient medium (such as a disk storage apparatus) having instructions tangibly embodied therein that are executed by a computer. Thus, it should be understood that the apparatus and hosted server may be executed on a computer. While the apparatus and hosted server are shown as being external to the network devices, the apparatus and hosted server may in fact be executed on a client terminal and/or network-connected device. Each of the apparatus and hosted server may in fact be executed on another one of the aforementioned devices.

The apparatus and hosted server may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

The network 21 may be provided via one or more of a secure intranet or extranet local area network, a wide area network (WAN), any type of network that allows secure access, etc., or a combination thereof. Further, other secure communications links (such as a virtual private network, a wireless link, etc.) may be used as well as the network connections. In addition, the network 21 may use TCP/IP (Transmission Control Protocol/Internet Protocol), but other protocols such as SNMP (Simple Network Management Protocol) and HTTP (Hypertext Transfer Protocol) can also be used.

How devices can connect to and communicate over the networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 6:
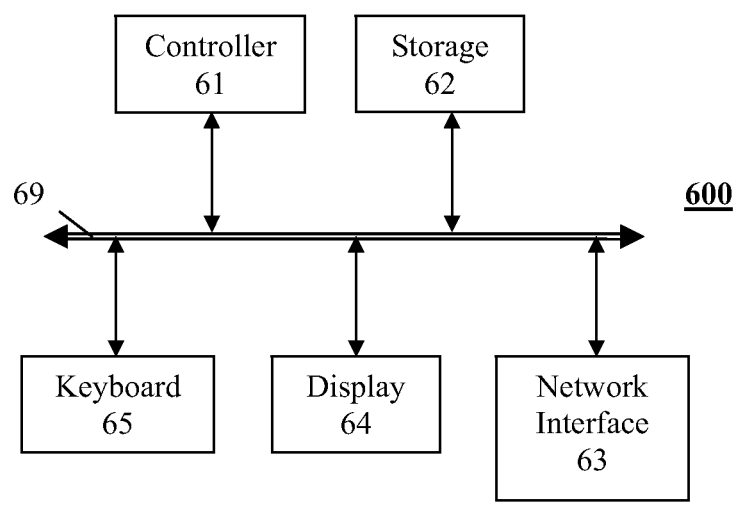
FIG. 6 shows a block diagram of an exemplary configuration of a computer that can be used to implement an apparatus for decoding marks, such as apparatus 10 illustrated in FIG. 1.

FIG. 6 shows an exemplary constitution of a apparatus as a computer, for example, that can be configured through software to provide the apparatus 10 illustrated in FIG. 1. As shown in FIG. 6, the computer 600 includes a controller (or central processing unit) 61 that communicates with a number of other components, including memory or storage part 62, network interface 63, display 64 and keyboard 65, by way of a system bus 69.

The computer 600 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In computer 600, the controller 61 executes program code instructions that controls device operations. The controller 61, memory/storage 62, network interface 63, display 64 and keyboard 65 are conventional, and therefore in order to avoid occluding the inventive aspects of this disclosure, such conventional aspects will not be discussed in detail herein.

The computer 600 includes the network interface 63 for communications through a network, such as communications through the network 21 with the hosted server 25 illustrated in FIG. 2. However, it should be appreciated that the subject matter of this disclosure is not limited to such configuration. For example, the apparatus 600 may communicate with client terminals through direct connections and/or through a network to which some components are not connected. As another example, the apparatus 600 need not be provided by a server that services terminals, but rather may communicate with the devices on a peer basis, or in another fashion.

Apparatuses 10 and 20 and hosted server 25 are not limited to a computer or server, but can be manifested in any of various devices that can be configured to communicate over a network and/or the Internet.

Moreover, the computer 600 illustrated in FIG. 6 can be configured through software to provide the apparatus 10 of FIG. 1 of the apparatus 20 and hosted server 25 of FIG. 2, in a manner similar to that described above.

Each of the apparatuses 10 and 20 and hosted server 25 may be any network-connected device including but not limited to a personal, notebook or workstation computer, a terminal, a kiosk, a PDA (personal digital assistant), a tablet computing device, a smartphone, a scanner, a printer, a facsimile machine, a multi-function device (MFD), a server, a mobile phone or handset, another information terminal, etc. Each device may be configured with software allowing the device to communicate through networks with other devices.

Figure 7:
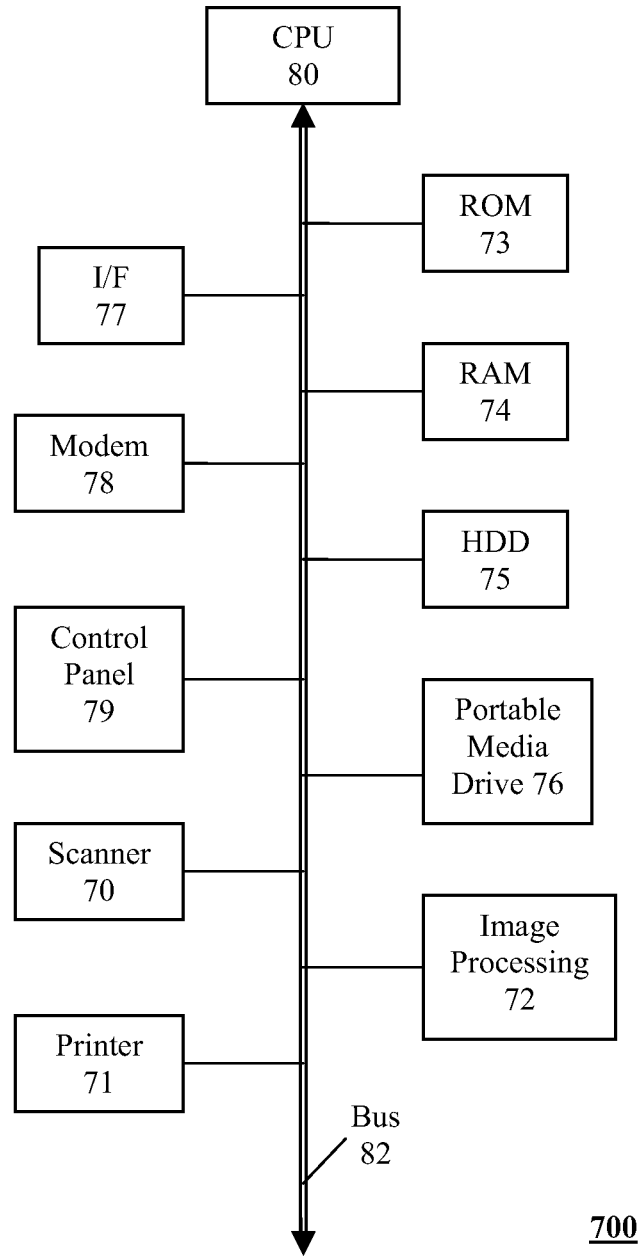
FIG. 7 shows a block diagram of an exemplary configuration of a multi-function device that can be used to implement an apparatus for decoding marks, such as apparatus 10 illustrated in FIG. 1.

An example of a configuration of a multi-function device (MFD) is shown schematically in FIG. 7. Device 700 includes a central processing unit (CPU) 80, and various elements connected to the CPU 80 by an internal bus 82. The CPU 80 services multiple tasks while monitoring the state of the device 700. The elements connected to the CPU 80 include a scanner unit 70, a printer unit 71, an image processing device 72, a read only memory (for example, ROM, PROM, EPROM, EEPROM, etc.) 73, a random access memory (RAM) 74, a hard disk drive (HDD) 75, portable media (for example, floppy disk, optical disc, magnetic discs, magneto-optical discs, semiconductor memory cards, etc.) drives 76, a communication interface (I/F) 77, a modem unit 78, and an operation panel 79.

Program code instructions for the device 700 can be stored on the read only memory 73, on the HDD 75, or on portable media and read by the portable media drive 76, transferred to the RAM 74 and executed by the CPU 80 to carry out the instructions. These instructions can include the instructions to the device to perform specified ones of its functions and permit the device 700 to interact with other network connected devices.

The operation panel 79 includes a display screen that displays information allowing the user of the device 700 to operate the device 700. The display screen can be any of various conventional displays (such as a liquid crystal display, a plasma display device, a cathode ray tube display, etc.), but is preferably equipped with a touch sensitive display (for example, liquid crystal display), and configured to provide the GUI based on information input by an operator of the device, so as to allow the operator to conveniently take advantage of the services provided by the system. The display screen does not need to be integral with, or embedded in, the operation panel 79, but may simply be coupled to the operation panel by either a wire or a wireless connection. The operation panel 79 may include keys for inputting information or requesting various operations. Alternatively, the operation panel 79 and the display screen may be operated by a keyboard, a mouse, a remote control, touching the display screen, voice recognition, or eye-movement tracking, or a combination thereof. The device 700 is a multifunction device (with scanner, printer and image processing) and in addition can be utilized as a terminal to download documents from a network.

Additional aspects or components of the device 700 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 8A:
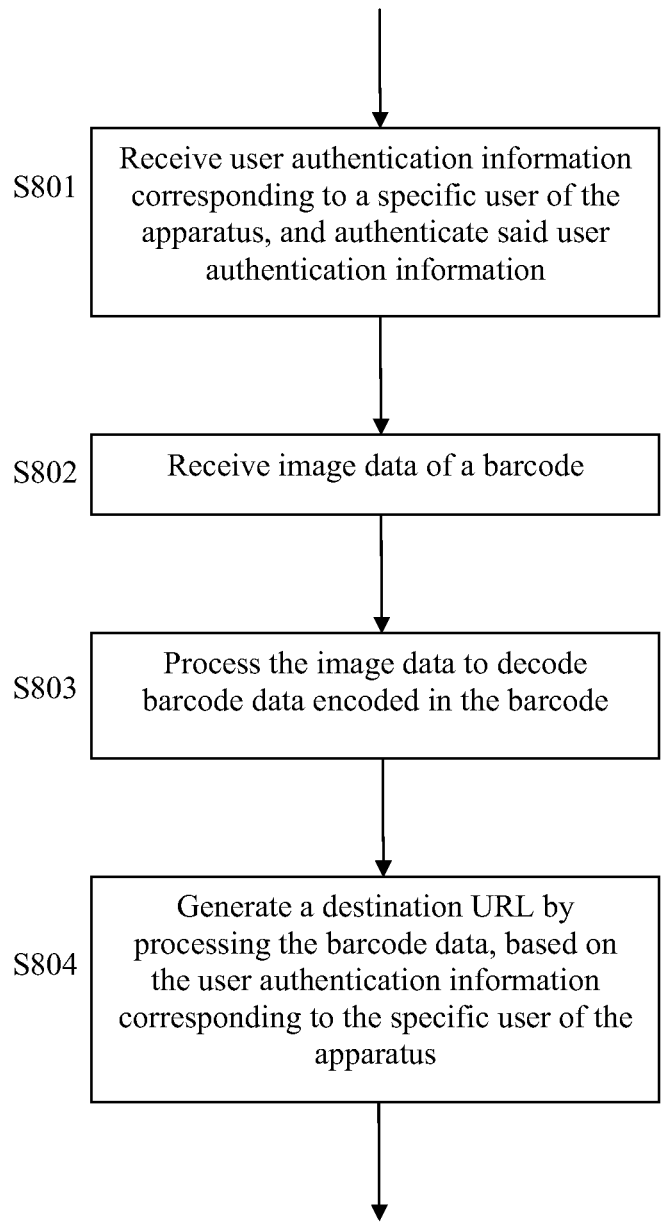
FIGS. 8A and 8B show flowcharts of methods performed by an apparatus, such as apparatus 10 illustrated in FIG. 1, according to an exemplary embodiment.

Turning now to FIG. 8A, there is shown a flowchart of a method performed by an apparatus such as apparatus 10 illustrated in FIG. 1, according to an exemplary embodiment.

In S801, the apparatus receives user authentication information corresponding to a specific user of the apparatus. An example of different user authentication information corresponding to different users is illustrated in FIG. 3. Moreover, in S801, the apparatus also authenticates the user authentication information, and thereby identifies a specific user of the apparatus.

In S802, the apparatus receives image data of a barcode. An example of a linear, one-dimensional barcode is illustrated in FIG. 4A, and an example of a matrix type, two-dimensional barcodes is illustrated in FIG. 4B. The apparatus may receive the image data of the barcode by receiving the image data as an electronic data transmission from a data network, or by using a scanner, reader or camera to scan, read or take an electronic photograph of the barcode.

In S803, the apparatus processes the image data to decode barcode data encoded in the barcode. As illustrated in FIG. 5, the barcode data may be the textual information "Ricoh".

Finally, in S804, the apparatus generates a content identifier/locator, such as a destination URL, by processing the barcode data, based on the user authentication information corresponding to the specific user of the apparatus. With reference to the example of FIG. 5, if the current user of the apparatus is John Smith (having a username "John Smith" as seen in the user identification information of FIG. 3), then based on the barcode data of "Ricoh" and the user name of "John Smith", the apparatus may generate the destination URL www.ricoh.com/john.smith, as seen in FIG. 5. On the other hand, if the current user of the apparatus is Jane Doe (having a username "Jane Doe" as seen in the user identification information of FIG. 3), then based on the barcode data of "Ricoh" and the user name of "Jane Doe", the apparatus may generate the destination URL www.ricoh.com/jane.doe, as seen in FIG. 5. Further, if the current user of the apparatus is Jim Oscar (having a username "Jim Oscar" as seen in the user identification information of FIG. 3), then based on the barcode data of "Ricoh" and the user name of "Jim Oscar", the apparatus may generate the destination URL www.ricoh.com/jim.oscar, as seen in FIG. 5. These destination URLs clearly takes into account both the barcode information encoded in the barcode and the identity of a specific user of the apparatus.

Figure 8B:
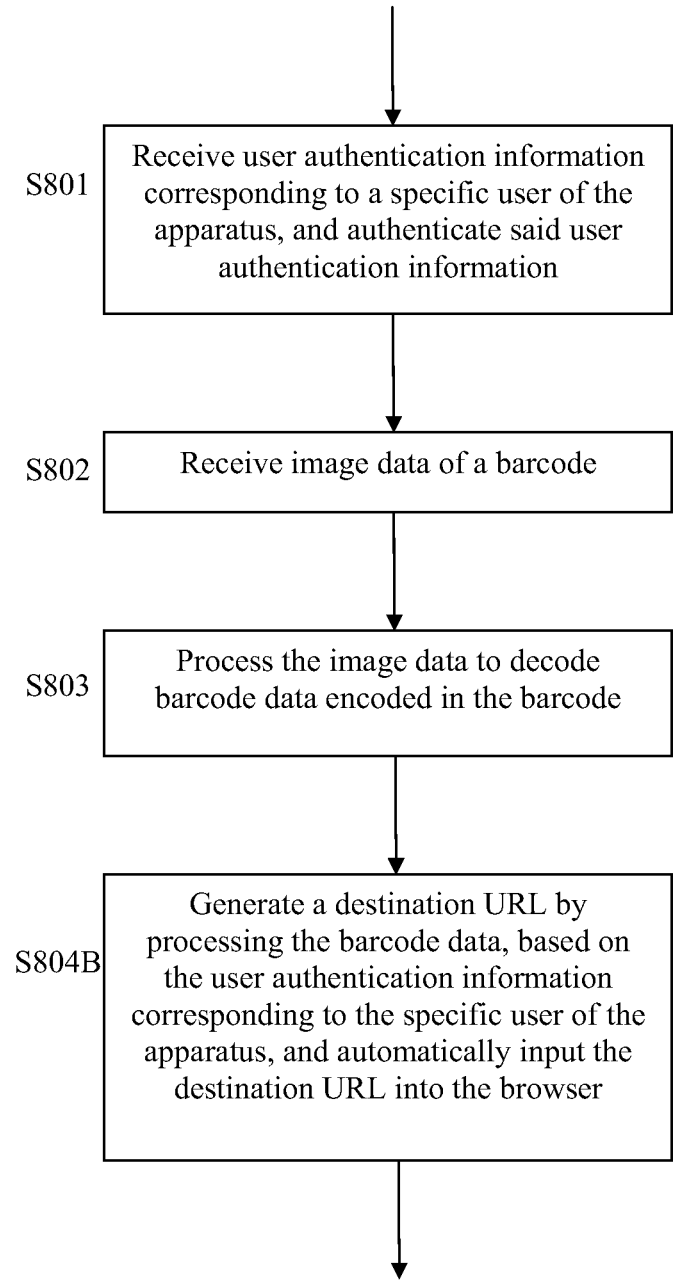

Moreover, as illustrated in S804B of FIG. 8B, the apparatus may also automatically input the destination URL into the browser, although this step is optional.

In the exemplary embodiments described above, the barcode data included in the barcode corresponds to textual information, and the processing part of the apparatus generates the content identifier/locator, such as the destination URL, based on the barcode data. In another exemplary embodiment, the textual information in the barcode data may itself correspond to a URL—referred to hereinafter as a 'barcode URL'. For example, barcodes are often attached to newspapers, printed materials and advertisements in order to represent URL of a website with pertinent information, and when a user with a device such as a mobile phone with a camera takes a digital photograph of the barcode, the barcode is decoded in order to retrieve the encoded URL, and the URL is utilized to access the corresponding website with useful information. According to this exemplary embodiment, the processing part of the apparatus may generate the destination URL by modifying the barcode URL, based on an identity and/or user authentication information corresponding to a user of the apparatus.

Figure 9:
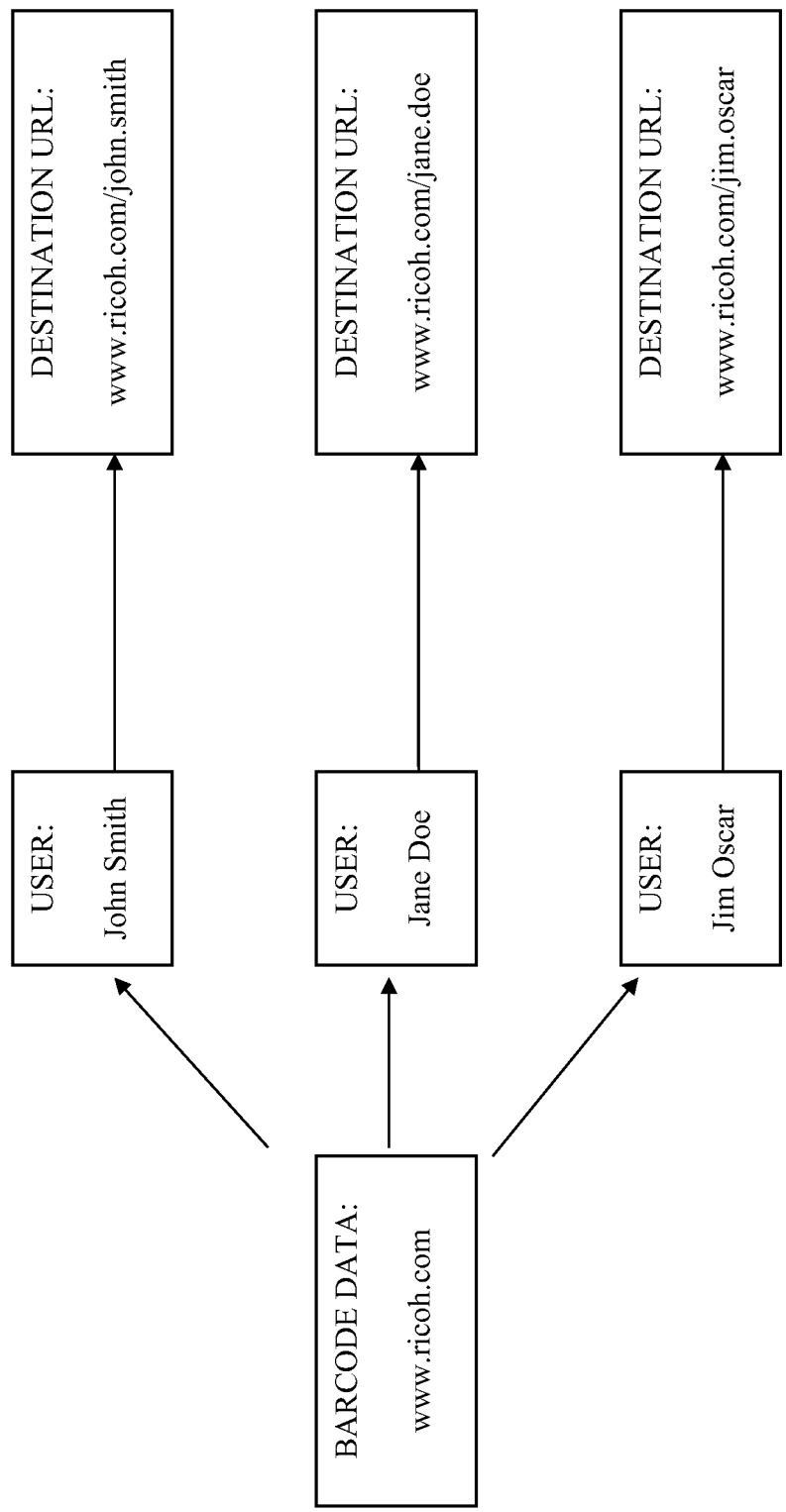
FIG. 9 illustrates an example of a procedure in which URL data of marks is modified to produce destination URLs specific to different users.

FIG. 9 illustrates a simple example of the aforementioned aspects, in accordance with an exemplary embodiment. As illustrated in FIG. 9, the barcode data encoded in the barcode represents the barcode URL "www.ricoh.com". Moreover, if the current user of the apparatus is John Smith (having a username "John Smith" as seen in the user identification information of FIG. 3), then based on the barcode URL of "www.ricoh.com" and the user name of "John Smith", the processing part 10c generates the destination URL "www.ricoh.com/john.smith", as seen in FIG. 9. This destination URL clearly takes into account both the barcode URL encoded in the barcode and the identity of a specific user of the apparatus.

On the other hand, if the current user of the apparatus is Jane Doe (having a username "Jane Doe" as seen in the user identification information of FIG. 3), then based on the barcode URL of "www.ricoh.com" and the user name of "Jane Doe", the processing part 10c generates the destination URL "www.ricoh.com/jane.doe", as seen in FIG. 9. Further, if the current user of the apparatus is Jim Oscar (having a username "Jim Oscar" as seen in the user identification information of FIG. 3), then based on the barcode URL of "www.ricoh.com" and the user name of "Jim Oscar", the processing part 10c generates the destination URL "www.ricoh.com/jim.oscar", as seen in FIG. 9.

Thus, according to this exemplary embodiment, the barcode data includes a barcode URL, and the apparatus generates a destination URL by modifying the barcode URL, based on the identity and/or user authentication information corresponding to a specific user of the apparatus.

In the example of FIG. 9 described above, the processing part of the apparatus generates the destination URL by attaching the forward slash symbol "/" followed by the username to the barcode URL, with a period symbol "." between the first and last name of the username. However, this basic example is merely illustrative, and many variations can be introduced without departing from the spirit of the disclosure or from the scope of the appended claims. That is, the aspects of this exemplary embodiment incorporates any situation in which barcode URL data encoded in a barcode is modified, based on other information (such as an identity of a user of an apparatus), in order to generate different destination URLs (for different users, for example).

While the examples described above refer to the generation of a content identifier corresponding to a destination URL by modifying a barcode URL, it should be understood the that barcode data encoded in the barcode may include various other types of information, and that the processing part may utilize both the barcode data and the identity of the user in order to generate different types of content and/or content identifiers. For example, instead of generating a destination URL, the processing part may modify barcode data based on an identity of the user to generate an email address, a phone number, an SMS/text address or number, video data, coupon information, a Facebook™ page, contact information, a calendar entry, text or string information, directions, or some other content or identifier of content that is generated by modifying the barcode data and is specifically tailored to the identity of the user.

Figure 10:
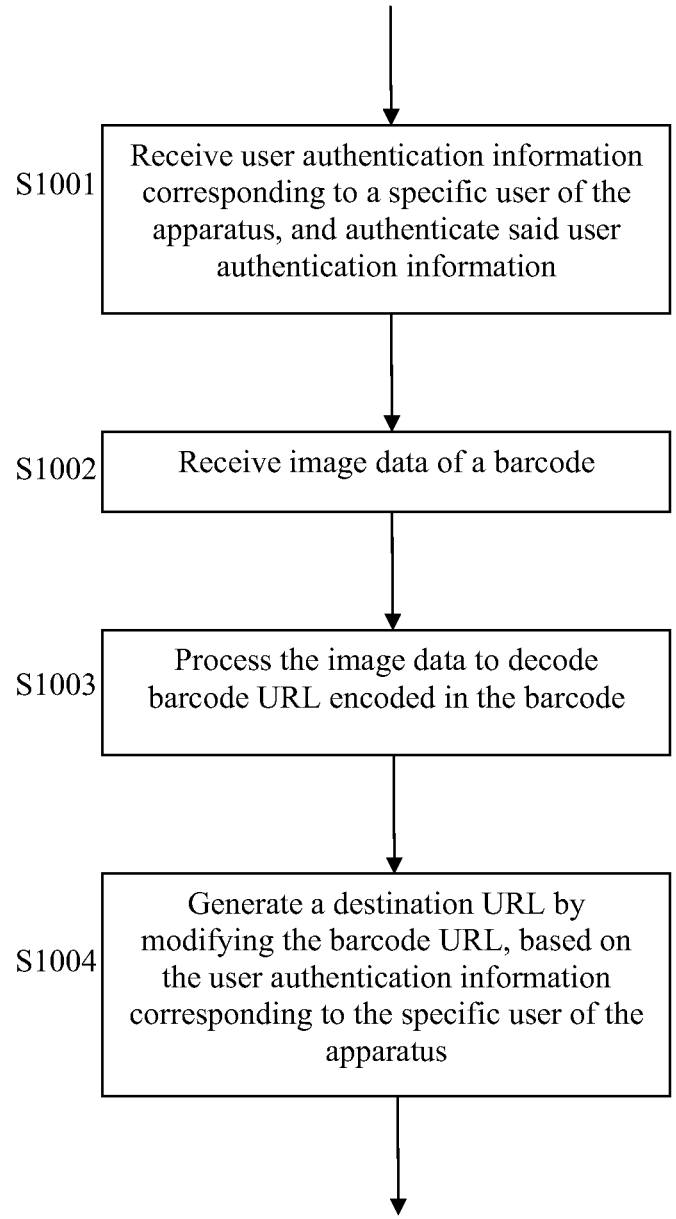
FIG. 10 shows a flowchart of a method performed by an apparatus, such as apparatus 10 illustrated in FIG. 1, according to an exemplary embodiment.

Turning now to FIG. 10, there is shown a flowchart of a method performed by an apparatus such as apparatus 10 illustrated in FIG. 1, according to an exemplary embodiment.

In S1001, the apparatus receives user authentication information corresponding to a specific user of the apparatus. An example of different user authentication information corresponding to different users is illustrated in FIG. 3. Moreover, in S1001, the apparatus also authenticates the user authentication information, and thereby identifies a specific user of the apparatus.

In S1002, the apparatus receives image data of a barcode. An example of a linear, one-dimensional barcode is illustrated in FIG. 4A, and an example of a matrix type, two-dimensional barcodes is illustrated in FIG. 4B. The apparatus may receive the image data of the barcode by receiving the image data as an electronic data transmission from a data network, or by using a scanner, reader or camera to scan, read or take an electronic photograph of the barcode.

In S1003, the apparatus processes the image data to decode a barcode URL encoded in the barcode. As illustrated in FIG. 9, the barcode URL data may be the URL "www.ricoh.com".

Finally, in S1004, the apparatus generates a destination URL by modifying the barcode URL, based on the user authentication information corresponding to the specific user of the apparatus. With reference to the example of FIG. 9, if the current user of the apparatus is John Smith (having a username "John Smith" as seen in the user identification information of FIG. 3), then based on the barcode URL "www.ricoh.com" and the user name of "John Smith", the apparatus may generate the destination URL "www.ricoh.com/john.smith", as seen in FIG. 9. On the other hand, if the current user of the apparatus is Jane Doe (having a username "Jane Doe" as seen in the user identification information of FIG. 3), then based on the barcode URL "www.ricoh.com" and the user name of "Jane Doe", the apparatus may generate the destination URL "www.ricoh.com/jane.doe", as seen in FIG. 9. Further, if the current user of the apparatus is Jim Oscar (having a username "Jim Oscar" as seen in the user identification information of FIG. 3), then based on the barcode URL "www.ricoh.com" and the user name of "Jim Oscar", the apparatus may generate the destination URL "www.ricoh.com/jim.oscar", as seen in FIG. 9. These destination URLs clearly takes into account both the barcode URL information encoded in the barcode and the identity of a specific user of the apparatus.

Moreover, in S1004, the apparatus may also automatically input the generated destination URL into the browser, although this step is optional.

Turning now to FIG. 11, there is described another exemplary embodiment of this disclosure. In this exemplary embodiment, the processing part 10c of the apparatus 10 generates the destination URL by referring to user destination information.

FIG. 11 illustrates an example of user destination information. As seen in FIG. 11, the user destination information lists examples of different types of barcode data, such as "XYZ Corporation Shirt Products", "ABC Corporation Hat Products" and "MNO Corporation Belt Products". Moreover, the user destination information also identifies a plurality of users of the apparatus by their username (or some other aspect of their user authentication information). For example, the user destination information identifies the usernames "John Smith", "Jane Doe", and "Jim Oscar".

Moreover, the user destination information of FIG. 11 indicates, for each of the plural types of barcode data, a destination URL corresponding to each user of the apparatus.

For example, suppose the barcode data represents the textual information "XYZ Corporation Shirt Products". If the username of the specific user is "John Smith", then the corresponding destination URL is "www.xyz.com/mens/shirts", whereas if the username of the specific user is "Jane Doe", then the corresponding destination URL is "www.xyz.com/womens/shirts", and if the username of the specific user is "Jim Oscar", then the corresponding destination URL is "www.xyz.com/kids/shirts". As another example, suppose the barcode data represents the textual information "ABC Corporation Hat Products". If the username of the specific user is "John Smith", then the corresponding destination URL is "www.abc.com/hats/john.smith", whereas if the username of the specific user is "Jane Doe", then the corresponding destination URL is "www.abc.com/hats/jane.doe", and if the username of the specific user is "Jim Oscar", then the corresponding destination URL is "www.abc.com/hats/jim.oscar". As another example, suppose the barcode data represents the textual information "MNO Corporation Belt Products". If the username of the specific user is "John Smith", then the corresponding destination URL is "www.mno.com/1957z", whereas if the username of the specific user is "Jane Doe", then the corresponding destination URL is "www.mno.com/d8g5c6", and if the username of the specific user is "Jim Oscar", then the corresponding destination URL is "www.mno.com/12dvbpo".

Thus, according to this exemplary embodiment, the processing part 10c of the apparatus may generate the destination URL, which takes into account barcode data encoded in a barcode and an identity of a specific user of the apparatus, by referring to user destination information.

For example, if the authentication part 10a of the apparatus authenticates the username "John Smith", thereby identifying the specific user of the apparatus as John Smith, and if the processing part decodes a barcode including the barcode data "MNO Corporation Belt Products", then the processing part may process this information and refer to the user destination information of FIG. 11, in order to determine that the corresponding destination URL is "www.mno.com/1957z". Thus, when the user John Smith utilizes the apparatus to scan or photograph the barcode that includes the information "MNO Corporation Belt Products", the browser of the apparatus will automatically direct John Smith to the destination URL "www.mno.com/1957z".

On the other hand, if the authentication part 10a of the apparatus authenticates the username "Jim Oscar", thereby identifying specific user of the apparatus as Jim Oscar, and if the processing part decodes the barcode including the barcode data "MNO Corporation Belt Products", then the processing part may process this information and refer to the user destination information of FIG. 11, in order to determine that the corresponding destination URL is "www.mno.com/12dvbpo". Thus, when the user Jim Oscar utilizes the apparatus to scan or photograph the barcode that includes the information "MNO Corporation Belt Products", the browser of the apparatus will automatically direct Jim Oscar to the destination URL "www.mno.com/12dvbpo".

Thus, according to this exemplary embodiment, even though the same barcode is scanned by different users, the processing of the barcode data encoded in this same barcode can generate different resulting information (such as different destination URLs) depending on a user of an apparatus.

While the examples described above refer to the generation of a content identifier corresponding to a destination URL, it should be understood the that barcode data encoded in the barcode and the user destination information may include various other types of information, and that the processing part may utilize both the barcode data, the identity of the user and the user destination information in order to generate different types of content and/or content identifiers. For example, instead of generating a destination URL, the processing part may process the barcode data based on an identity of the user and the user destination information to generate an email address, a phone number, an SMS/text address or number, video data, coupon information, a Facebook™ page, contact information, a calendar entry, text or string information, directions, or some other content or identifier of content that is generated by processing the barcode data and is specifically tailored to the identity of the user.

The various information in the system and apparatus of this disclosure, such as the destination URLs included in the user destination information, may be generated and entered in advance by a user, manager or IT administrator, etc., of a system. As another non-limiting example, the URLs may be dynamically created by the processing part 10c. For example, if the processing part determines that the user is in a specific age group, sex or other demographic, the processing part may utilize this information in order to customize the destination URL. The resulting destination URLs may be similar to those corresponding to the "XYZ Corporation" in the user destination information of FIG. 11. As another example, the processing part 10c may simply append the username with a period symbol "." between the first and last name, to the end of a standard destination URL corresponding to the barcode data. The resulting destination URLs may be similar to those corresponding to the "ABC Corporation" in the user destination information of FIG. 11. As another non-limiting example, the URLs may be dynamically created single use URLs for privacy and security reasons. The resulting destination URLs may be similar to those corresponding to the "MNO Corporation" in the user destination information of FIG. 11.

While the user destination information of FIG. 11 refers to barcode data that includes textual pieces of information, it is of course possible that the barcode data encodes barcode URLs that are then modified by the processing part in order to generate destination URLs, as described in other embodiments of this disclosure.

The user destination information may be stored by a storage part of the apparatus 10, and accessed by the processing part 10c of the apparatus 10. For example, the user destination information may be stored in the storage part 62 of the computer 600 illustrated in FIG. 6, or the Hard Disk Drive 75 of the multi-function device 700 illustrated in FIG. 7, wherein each of these devices may be utilized to provide the functionality of the apparatus 10.

Alternatively, the user destination information may be stored externally to the apparatus 10, and the processing part 10c of the apparatus may access the externally-located user destination information. For example, in the system 200 of FIG. 2, the user destination information may be stored in the data store 27, and a processing part of the apparatus 10 may access the user destination information stored in the data store via the network 27. Similarly, if the processing part 25a of the hosted server 25 is performing processing functions, then the processing part 25a of the hosted server 25 may access the user destination information stored in the data store via the network 27. Instead or in addition, the user destination information may be stored in a storage part of the hosted server 25. For example, the user destination information may be stored in the storage part 62 of the computer 600 illustrated in FIG. 6, or the Hard Disk Drive 75 of the multi-function device 700 illustrated in FIG. 7, wherein each of these devices may be utilized to provide the functionality of the hosted server 25.

Figure 12:
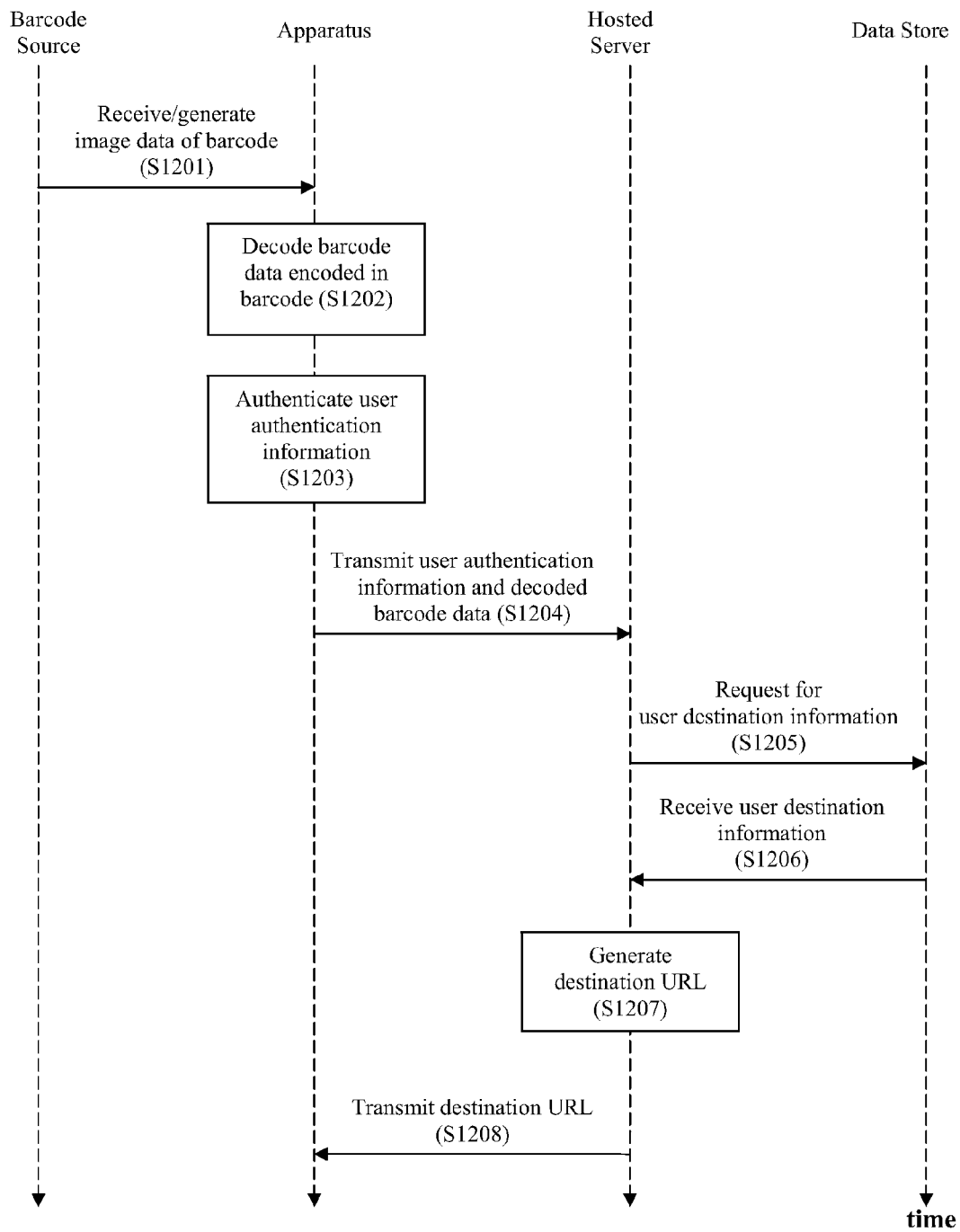
FIG. 12 illustrates a schematic diagram demonstrating a data flow in a system, such as system 200 illustrated in FIG. 2, according to an exemplary embodiment.

Turning now to FIG. 12, there is illustrated a schematic diagram illustrating an example of a data flow in a system, such as system 200 illustrated in FIG. 2, according to an exemplary embodiment.

In S1201, an apparatus receives image data of a barcode from a source. For example, the image data may be received as an electronic data transmission via a network. Alternatively, the apparatus may include a scanner, reader or camera in order to scan, read or take a digital photograph of the barcode itself. An example of a linear, one-dimensional barcode is illustrated in FIG. 4A, while an example of a matrix type, two-dimensional barcode is illustrated in FIG. 4B. In S1202, the apparatus decodes the barcode data encoded in the barcode, and in S1203, the apparatus authenticates user authentication information received by the apparatus, in order to authenticate a user. An example of user authentication information is illustrated in FIG. 3. In S1204, the apparatus transmits the user authentication information corresponding to the user of the apparatus, as well as the decoded barcode data that was decoded in S1202, to a hosted server.

Thereafter, in S1205, the hosted server transmits a request for one or more portions of user destination information to a data store, and in S1206 the hosted server receives the one or more portions of the user destination information. An example of user destination information is illustrated in FIG. 11. In S1207, the hosted server generates a destination URL, based on the user authentication information and decoded barcode data received in S1204, by referring to the user destination information received in S1206. Finally, in 51208, the hosted server transmits the destination URL back to the apparatus.

Figure 13:
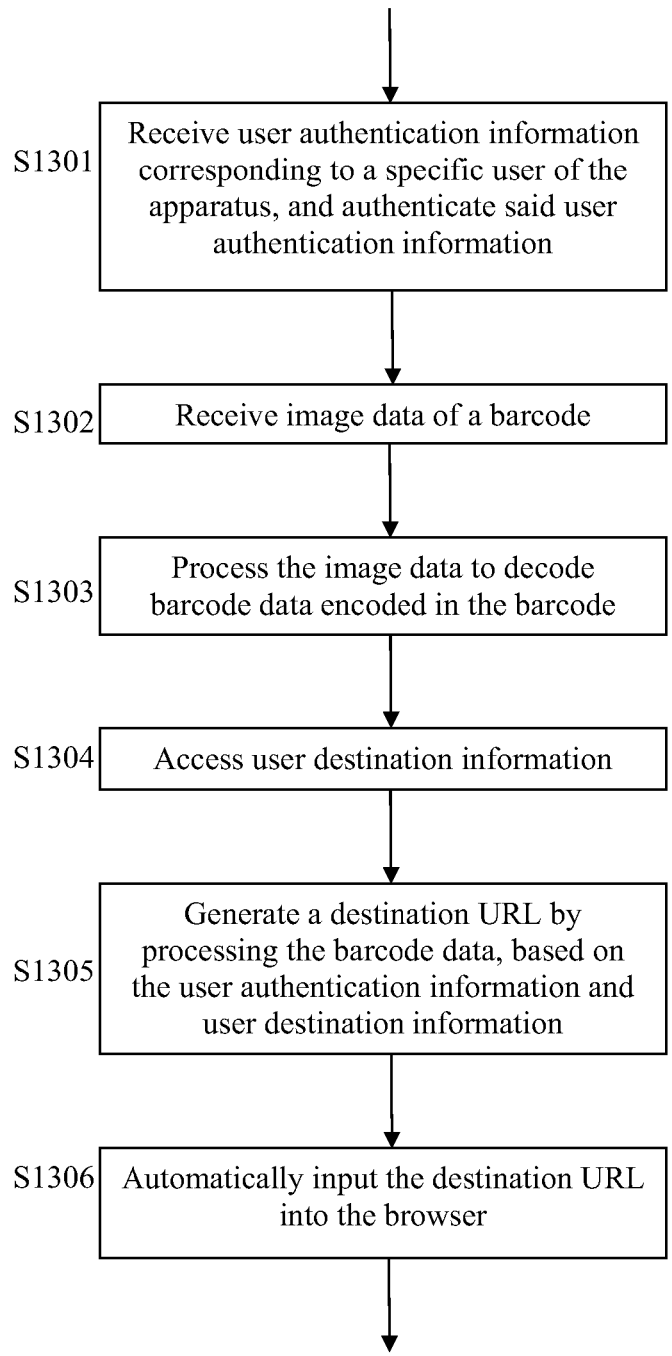
FIG. 13 shows a flowchart of a method performed by an apparatus, such as apparatus 10 illustrated in FIG. 1, according to an exemplary embodiment.

Turning now to FIG. 13, there is shown a flowchart of a method performed by an apparatus, such as apparatus 10 illustrated in FIG. 1, according to an exemplary embodiment.

In S1301, the apparatus receives user authentication information corresponding to a specific user of the apparatus. An example of different user authentication information corresponding to different users is illustrated in FIG. 3. Moreover, in S1301, the apparatus also authenticates the user authentication information, and thereby identifies a specific user of the apparatus.

In S1302, the apparatus receives image data of a barcode. An example of a linear, one-dimensional barcode is illustrated in FIG. 4A, and an example of a matrix type, two-dimensional barcodes is illustrated in FIG. 4B. The apparatus may receive the image data of the barcode by receiving the image data as an electronic data transmission from a data network, or by using a scanner, reader or camera to scan, read or take an electronic photograph of the barcode. In S1303, the apparatus processes the image data to decode a barcode URL/data encoded in the barcode. In S1304, the apparatus accesses user destination information, an example of which is illustrated in FIG. 11.

Thereafter, in S1305, the apparatus generates a destination URL, which takes into account the barcode data encoded in the barcode and the identity (or user authentication information) of a specific user of the apparatus, by referring to the user destination information. Moreover, in S1306, the apparatus automatically inputs the generated destination URL into the browser, although this step is optional.

With reference to the exemplary user destination information of FIG. 11, if the apparatus authenticates the username "John Smith", thereby identifying the specific user of the apparatus as John Smith, and if the processing part decodes a barcode including the barcode data "MNO Corporation Belt Products", then the processing part may process this information and refer to the user destination information of FIG. 11, in order to determine that the corresponding destination URL is "www.mno.com/1957z". Thus, when the user John Smith utilizes the apparatus to scan or photograph the barcode that includes the information "MNO Corporation Belt Products", the browser of the apparatus will automatically direct John Smith to the destination URL "www.mno.com/1957z".

As another example, if the authentication part 10a of the apparatus authenticates the username "Jim Oscar", thereby identifying specific user of the apparatus as Jim Oscar, and if the processing part decodes the barcode including the barcode data "MNO Corporation Belt Products", then the processing part may process this information and refer to the user destination information of FIG. 11, in order to determine that the corresponding destination URL is "www.mno.com/12dvbpo". Thus, when the user Jim Oscar utilizes the apparatus to scan or photograph the same barcode that includes the information "MNO Corporation Belt Products", the browser of the apparatus will automatically direct Jim Oscar to the destination URL "www.mno.com/12dvbpo".

Thus, according to this exemplary embodiment, even though the same barcode is scanned by different users, the processing of the barcode data encoded in this same barcode can generate different resulting information (such as different destination URLs) depending on a user of an apparatus.

While the previous embodiment includes user destination information, wherein the barcode information is processed based on the identity or user authentication information corresponding the user, according to another exemplary embodiment of this disclosure, the barcode information is processed based on a user role or a user.

For example, FIG. 14 illustrates an example of user role information that defines a role of each user of an apparatus. For example, the user role corresponding to the username "John Smith" is user role 1, the user role corresponding to the username "Jane Doe" is user role 2, the user role corresponding to the username "Jim Oscar" is user role 3 and user role 4, and so forth. It should be noted that users and user roles need not have a one-to-one relationship, and one user may corresponds to multiple user roles (e.g. Jim Oscar in FIG. 14), and the processing described below may take place accordingly.

FIG. 15 illustrates an example of role definition information defining each of various possible user roles. In the example of FIG. 15, user role 1 is defined as a basic user, user role 1 is defined as a preferred user, user role 3 is defined as a sales person user, user role 4 is defined as a stock person user, and user role 5 is defined as a manager. The user role information (FIG. 14) and role definition information (FIG. 15) may be generated and entered in advance by a user, manager or IT system administrator, for example.

In this exemplary embodiment, the barcode data encoded in barcodes is processed based on a user role of a specific user of an apparatus. Alternatively, the barcode URLs encoded in barcodes are modified based on a user role of a specific user of an apparatus. For example, if a user having a user role of 1 (i.e. a basic user) scans a particular barcode, then a first particular destination URL may be generated. On the other hand, if a user having a user role of 5 (i.e. a manager) scans the same particular barcode, then a second particular destination URL may be generated. The generated destination URL may be automatically inputted into a browser operating on the apparatus, as described above.

In this exemplary embodiment, the apparatus 10 may stored role-specific destination information that may be used for processing barcode data based on user roles of users, in order to generate a destination URL corresponding to the user role of the user.

FIG. 16 illustrates an example of role-specific destination information. As seen in FIG. 16, the role-specific destination information lists examples of different types of barcode data encoded in a barcode, such as "xyz.com/000", "xyz.com/001", "xyz.com/002", and so on. Moreover, the role-specific destination information also identifies a plurality of possible user roles for users of the apparatus. For example, the role-specific destination information identifies "User Role 1", "User Role 2", "User Role 3", etc.

Moreover, the role-specific destination information of FIG. 16 indicates, for each of the plural types of barcode data, a destination URL corresponding to each of the possible user roles.

For example, suppose that a barcode URL encoded in a barcode is "xyz.com/000". If the user role of the specific user of the apparatus is "User Role 1", then the corresponding destination URL is "xyz.com/100", whereas if the user role of the specific user is "User Role 2", then the corresponding destination URL is "xyz.com/200", and if the user role of the specific user is "User Role 3", then the corresponding destination URL is "xyz.com/300", and so forth. As another example, suppose the barcode URL encoded in the barcode is "xyz.com/002". If the user role of the specific user of the apparatus is "User Role 1", then the corresponding destination URL is "xyz.com/102", whereas if the user role of the specific user is "User Role 2", then the corresponding destination URL is "xyz.com/202", and if the user role of the specific user is "User Role 3", then the corresponding destination URL is "xyz.com/303", and so forth. As another example, suppose the barcode URL encoded in the barcode is "xyz.com/005". If the user role of the specific user of the apparatus is "User Role 1", then the corresponding destination URL is "xyz.com/105", whereas if the user role of the specific user is "User Role 2", then the corresponding destination URL is "xyz.com/205", and if the user role of the specific user is "User Role 3", then the corresponding destination URL is "xyz.com/305", and so forth.

Thus, according to this exemplary embodiment, the processing part 10c of the apparatus may generate the destination URL, which takes into account barcode data encoded in a barcode and a user role of a specific user of the apparatus, by referring to role-specific destination information.

Further, according to this exemplary embodiment, the different destination URLs may take the users to different locations or websites (or different portions of the same website) that have features and programs specifically tailored to the different possible user roles.

Such aspects of this embodiment will be explained with reference to a specific example. Consider a scenario where XYZ store, a department store, has added QR codes to their store signage and/or products in their store. XYZ store may want to provide more functionality for their staff and customers, and thus the store may provide a custom store smart phone application for staff and customers. The smart phone app may include a plurality of instructions that, when executed by the processor of the smartphone, cause the smartphone to function as the apparatus 10 or 20 described in the exemplary embodiments of this disclosure.

In this example, the user role information of FIG. 14 may specify the user roles assigned to each specific employee or customer of the XYZ store system. Moreover, the role definition information of FIG. 15 may define in greater detail the different types of possible user roles for the XYZ store system (e.g. preferred user, stock person user, etc.).

For example, according to the role definition information of FIG. 15, the basic user (i.e. user role 1) is not entitled to any specific features/information. That is, this basic, outside user may be directed to a publically viewable web page for the XYZ store that does not contain any private information. In contrast, the preferred user (i.e. user role 2) may be entitled to specific features/information such as: special pricing or promotions for selected/scanned items or other specific items; product info such as care instructions for selected/scanned items or other specific items; feedback from other users for selected/scanned items or other specific items; request for associate help at selected/scanned item location; and so on. Thus, the preferred user may be directed to a destination URL offering such features/information.

As another example, according to the role definition information of FIG. 15, the sales person user (i.e. user role 3) may be entitled to specific features/information such as: pricing history for selected/scanned items or other specific items; audio/visual training information on how to best sell selected/scanned items or other specific items; and a list of popular 'sell up' items for selected/scanned items. Thus, the sales person user may be directed to a destination URL offering such features/information.

As another example, according to the role definition information of FIG. 15, the stock persons user (i.e. user role 4) may be entitled to specific features/information such as: a number of selected/scanned items or other specific items as recorded in an inventory system; and a number of the selected/scanned items or other specific items in other stores or in transit. Thus, the stock person user may be directed to a destination URL offering such features/information.

As yet another example, according to the role definition information of FIG. 15, the manager (i.e. user role 5) may be entitled to specific features/information such as: access to all other features/information of the other user roles; access to management specific dashboard to access to store analytics and information; and so forth. Thus, the stock person user may be directed to a destination URL offering such features/information.

In this exemplary embodiment, the role-specific definition information of FIG. 16 may indicate, for a given scanned or received piece of barcode data, the destination URLs corresponding to each of the user roles of users of the system.

For example, suppose the authentication part 10a of the apparatus authenticates the username "John Smith", thereby identifying the specific user of the apparatus as John Smith. Then the processing part may refer to the user role information of FIG. 14 to determine the user John Smith has the user role 1 (i.e. a basic user). If the processing part decodes a barcode including the barcode data "xyz.com/003", the processing part may refer to the user-role destination information of FIG. 16, in order to determine that the corresponding destination URL is "xyz.com/103". Thus, when the basic user John Smith utilizes the apparatus to scan or photograph the barcode that includes the information "xyz.com/003", the browser of the apparatus will automatically direct John Smith to the destination URL "xyz.com/103".

On the other hand, suppose the authentication part 10a of the apparatus authenticates the username "Jane Doe", thereby identifying the specific user of the apparatus as Jane Doe. Then the processing part may refer to the user role information of FIG. 14 to determine the user Jane Doe has the user role 2 (i.e. a preferred user). If the processing part decodes a barcode including the barcode data "xyz.com/003", the processing part may refer to the user-role destination information of FIG. 16, in order to determine that the corresponding destination URL is "xyz.com/203". Thus, when the preferred user Jane Doe utilizes the apparatus to scan or photograph the barcode that includes the information "xyz.com/003", the browser of the apparatus will automatically direct Jane Doe to the destination URL "xyz.com/203". The destination URL may include features/information specifically tailored to a preferred user such as Jane Doe, including, for example, special pricing or promotions for selected/scanned items or other specific items, product info such as care instructions for selected/scanned items or other specific items, feedback from other users for selected/scanned items or other specific items, request for associate help at selected/scanned item location, and so on.

Thus, according to this exemplary embodiment, even though the same barcode is scanned by different users, the processing of the barcode data encoded in this same barcode can generate different destination URLs, depending on the user role of the user that scanned the barcode. That is, a user having a first role may be directed towards a first destination URL, and a user having a second role may be directed towards a second destination URL, even though both the users scan the same barcode.

While the examples described above refer to the generation of a content identifier corresponding to a destination URL, it should be understood the that barcode data encoded in the barcode and the role-specific destination information may include various other types of information, and that the processing part may utilize both the barcode data, the identity of the user and the role-specific destination information in order to generate different types of content and/or content identifiers. For example, instead of generating a destination URL, the processing part may process the barcode data based on an identity of the user and the role-specific destination information to generate an email address, a phone number, an SMS/text address or number, video data, coupon information, a Facebook™ page, contact information, a calendar entry, text or string information, directions, or some other content or identifier of content that is generated by processing the barcode data and is specifically tailored to the identity of the user.

One or more of the user role information (e.g. FIG. 14), role definition information (e.g. FIG. 15) and role-specific destination information (e.g. FIG. 16) may be stored by a storage part of the apparatus 10, and accessed by the processing part 10c of the apparatus 10. For example, such information may be stored in the storage part 62 of the computer 600 illustrated in FIG. 6, or the Hard Disk Drive 75 of the multi-function device 700 illustrated in FIG. 7, wherein each of these devices may be utilized to provide the functionality of the apparatus 10.

Alternatively, one or more of the user role information, role definition information and role-specific destination information may be stored externally to the apparatus 10, and the processing part 10c of the apparatus may access the information. For example, in the system 200 of FIG. 2, one or more of the user role information, role definition information and role-specific destination information may be stored in the data store 27, and a processing part of the apparatus 10 may access the user destination information stored in the data store via the network 27. Similarly, if the processing part 25a of the hosted server 25 is performing processing functions, then the processing part 25a of the hosted server 25 may access the information stored in the data store via the network 27. Instead or in addition, one or more of the user role information, role definition information and role-specific destination information may be stored in a storage part of the hosted server 25. For example, the such information may be stored in the storage part 62 of the computer 600 illustrated in FIG. 6, or the Hard Disk Drive 75 of the multi-function device 700 illustrated in FIG. 7, wherein each of these devices may be utilized to provide the functionality of the hosted server 25.

Figure 17:
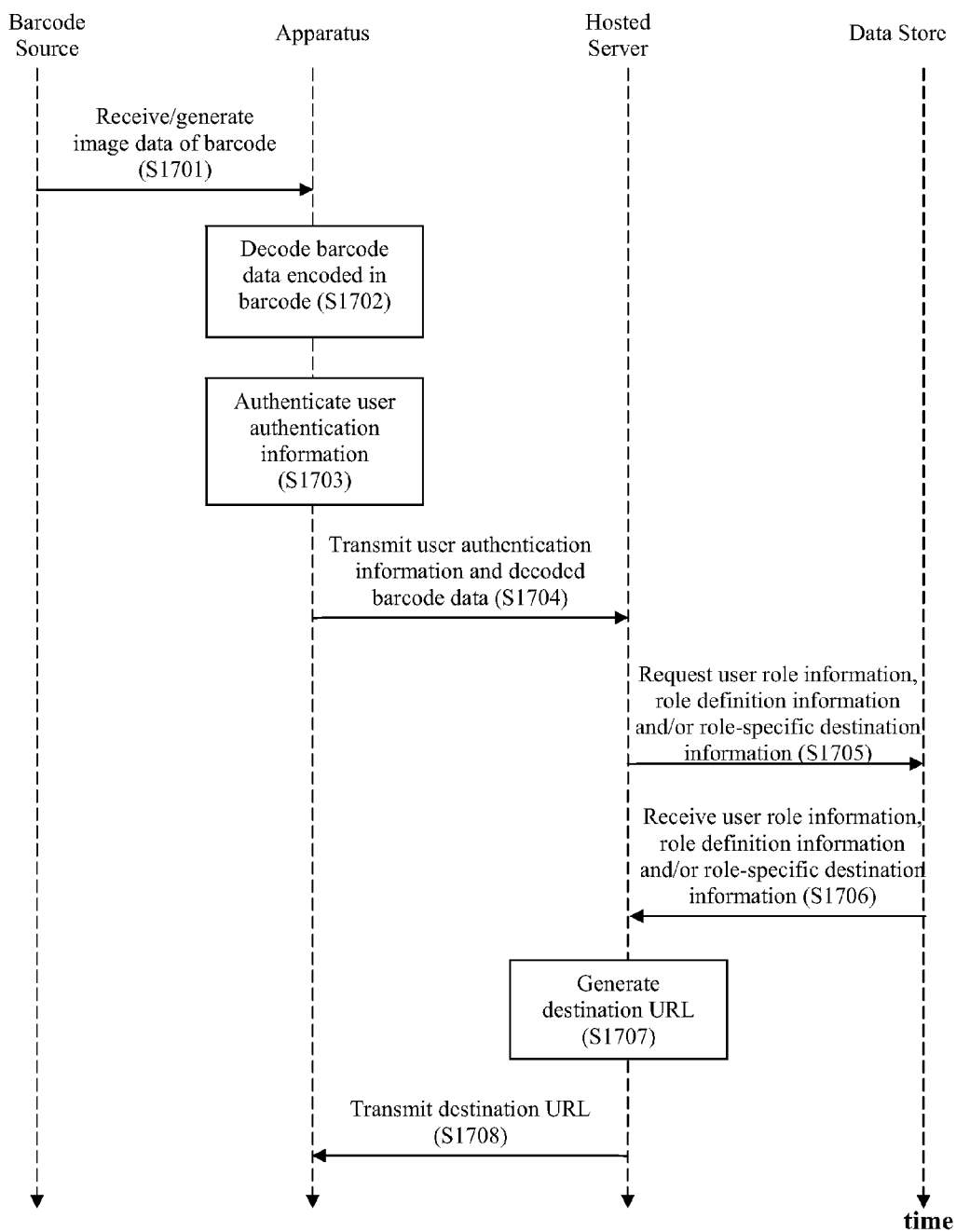
FIG. 17 illustrates a schematic diagram demonstrating a data flow in a system, such as system 200 illustrated in FIG. 2, according to an exemplary embodiment.

Turning now to FIG. 17, there is illustrated a schematic diagram illustrating an example of a data flow in a system, such as system 200 illustrated in FIG. 2, according to an exemplary embodiment.

In S1701, an apparatus receives image data of a barcode from a source. For example, the image data may be received as an electronic data transmission via a network. Alternatively, the apparatus may include a scanner, reader or camera in order to scan, read or take a digital photograph of the barcode itself. An example of a linear, one-dimensional barcode is illustrated in FIG. 4A, while an example of a matrix type, two-dimensional barcode is illustrated in FIG. 4B. In S1702, the apparatus decodes the barcode data encoded in the barcode, and in S1703, the apparatus authenticates user authentication information received by the apparatus, in order to authenticate a user. An example of user authentication information is illustrated in FIG. 3. In S1704, the apparatus transmits the user authentication information corresponding to the user of the apparatus, as well as the decoded barcode data that was decoded in S1702, to a hosted server.

Thereafter, in S1705, the hosted server transmits a request for one or more of user role information, role definition information and role-specific destination information to a data store, and in S1706 the hosted server receives one or more of user role information, role definition information and role-specific destination information. In S1707, the hosted server generates a destination URL, based on the decoded barcode data received in S1704, and the user role information and role-specific destination information received in S1706. Finally, in S1708, the hosted server transmits the destination URL back to the apparatus.

Figure 18:
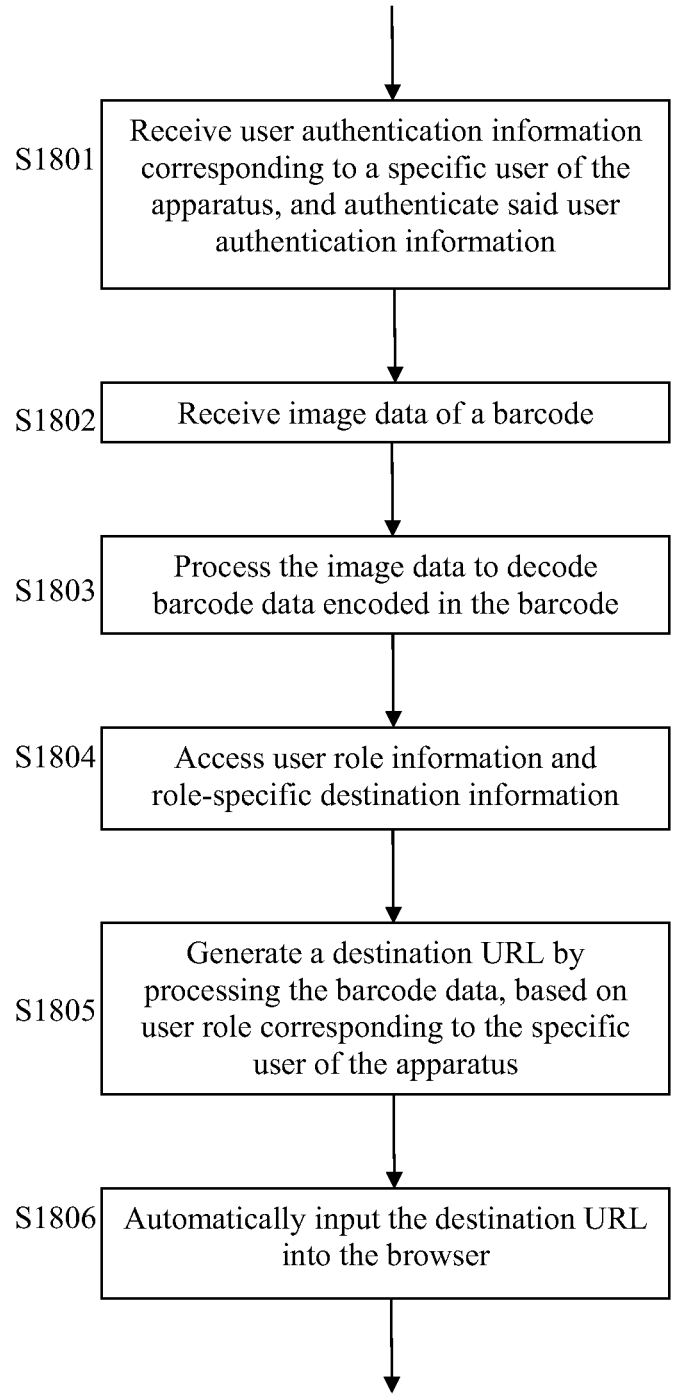
FIG. 18 shows a flowchart of a method performed by an apparatus, such as apparatus 10 illustrated in FIG. 1, according to an exemplary embodiment.

Turning now to FIG. 18, there is shown a flowchart of a method performed by an apparatus, such as apparatus 10 illustrated in FIG. 1, according to an exemplary embodiment.

In S1801, the apparatus receives user authentication information corresponding to a specific user of the apparatus. An example of different user authentication information corresponding to different users is illustrated in FIG. 3. Moreover, in S1801, the apparatus also authenticates the user authentication information, and thereby identifies a specific user of the apparatus.

In S1802, the apparatus receives image data of a barcode. An example of a linear, one-dimensional barcode is illustrated in FIG. 4A, and an example of a matrix type, two-dimensional barcodes is illustrated in FIG. 4B. The apparatus may receive the image data of the barcode by receiving the image data as an electronic data transmission from a data network, or by using a scanner, reader or camera to scan, read or take an electronic photograph of the barcode. In S1803, the apparatus processes the image data to decode a barcode URL/barcode data encoded in the barcode. In S1804, the apparatus accesses user role information and role-specific destination information, examples of which are illustrated in FIGS. 14 and 16, respectively.

Thereafter, in S1805, the apparatus generates a destination URL, which takes into account the barcode data encoded in the barcode and the user role of a specific user of the apparatus, by referring to the user role information and role-specific destination information. Moreover, in S1806, the apparatus automatically inputs the generated destination URL into the browser, although this step is optional.

Thus, according to this exemplary embodiment, even though the same barcode is scanned by different users, the processing of the barcode data encoded in this same barcode can generate different resulting information (such as different destination URLs) depending on the different possible user roles of the users.

Turning now to FIGS. 19-22, there is described another exemplary embodiment of this disclosure.

While an aspect of the previous embodiments is the processing of barcode data/URLs based on an identity or user authentication information of a user, or based on a user role of user, in this exemplary embodiment barcode data/URLs are processed based, at least in part, on a current time or time value or time period. The time value may be, for example, a time of the day, a specific employee work shift of the day for an organization, and so forth.

For example, FIG. 19 illustrates an example of user destination information similar to the user destination information of FIG. 11. The user destination information of FIG. 11 indicates, for a given type of barcode data, a corresponding destination URL for one or more different users. In contrast, the user destination information of FIG. 19 further indicates, for a given type of barcode data, a corresponding destination URL for one or more users depending on specific times of the day. That is, if the barcode data is the information "XYZ Corporation Shirt Products" and the user is "John Smith", then the destination URL during a morning time period is "www.xyz.com/mens/shirts/morning", and the destination URL during an afternoon time period is "www.xyz.com/mens/shirts/afternoon", and the destination URL during an evening time period is "www.xyz.com/mens/shirts/evening". Thus, the processing part 10c of the apparatus 10 may generate a destination URL, based on one or more of (i) a given piece of barcode data, (ii) a specific user of the apparatus, and (iii) a specific time value or time period, by referring to the user destination information of FIG. 19.

As another example, FIG. 20 illustrates an example of role-specific destination information similar to the role-specific destination information of FIG. 16. The role-specific destination information of FIG. 16 indicates, for a given type of barcode data, a corresponding destination URL for one or more different possible user roles. In contrast, the role-specific destination information of FIG. 20 further indicates, for a given type of barcode data/URL, a corresponding destination URL for one or more user roles depending on specific times periods. That is, if the barcode data is the information "xyz.com/001" and the user role is "User Role 4", then the destination URL during a "Shift 1" time period is "xyz.com/401/shift1", and the destination URL during a "Shift 2" time period is "xyz.com/401/shift2", and the destination URL during a "Shift 3" time period is "xyz.com/401/shift3". Thus, the processing part 10c of the apparatus 10 may generate a destination URL, based on one or more of (i) a given piece of barcode data, (ii) a specific user role of a user of the apparatus, and (iii) a specific time value or time period, by referring to the role-specific destination information of FIG. 20.

The different URLs in this embodiment may allow users to access different websites (or different portions of the same website) with features/information specifically tailored to a particular time period. For example, referring to the role-specific destination information of FIG. 20, since the user role 4 corresponds to a stock person user, the destination URL for shift 1 may contain features/information specifically tailored to a day shift, when customer purchases may be frequent, whereas the destination URL for shift 2 may contain features/information specifically tailored to an evening shift, when customer purchases may be very frequent, and whereas the destination URL for shift 3 may contain features/information specifically tailored to an overnight shift, when customer purchases may be less frequent.

While the information of FIGS. 23 and 24 illustrates how barcode information encoded in a barcode may be processed based on both (a) an identity/role of a user and (b) a time period, it should be understood that the barcode information encoded in the barcode may be processed based on the time period alone, without taking into consideration the identity/role of the user. For example, the temporal destination information of FIG. 21 indicates, for a given type of barcode data, a corresponding destination URL for one or more time periods. That is, if the barcode data is the information "XYZ Corporation Shirt Products" and the time period is morning, then the destination URL is "www.xyz.com/mens/shirts/morning", whereas if the barcode data is the information "XYZ Corporation Shirt Products" and the time period is afternoon, then the destination URL is "www.xyz.com/mens/shirts/afternoon", whereas if the barcode data is the information "XYZ Corporation Shirt Products" and the time period is evening, then the destination URL is "www.xyz.com/mens/shirts/evening". Thus, the processing part 10c of the apparatus 10 may generate a destination URL, based on a given piece of barcode data and a time period, by referring to the temporal destination information of FIG. 21.

While the examples described above refer to the generation of a content identifier corresponding to a destination URL, it should be understood the that barcode data encoded in the barcode and the user destination information, role-specific destination information and/or temporal destination information may include various other types of information, and that the processing part may utilize this information in order to generate different types of content and/or content identifiers. For example, instead of generating a destination URL, the processing part may process the barcode data based on the user destination information, role-specific destination information and/or temporal destination information, to generate a phone number, an SMS/text address or number, video data, coupon information, a Facebook™ page, contact information, a calendar entry, text or string information, directions, or some other content or identifier of content that is generated by processing the barcode data and is specifically tailored to time value or time period.

Figure 22:
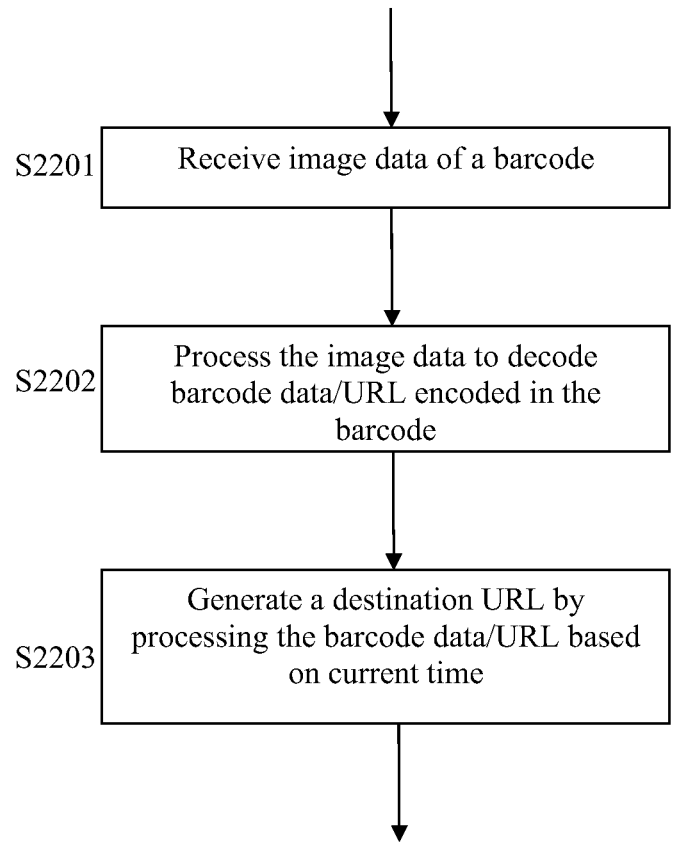
FIG. 22 shows a flowchart of a method performed by an apparatus, such as apparatus 10 illustrated in FIG. 1, according to an exemplary embodiment.

Turning now to FIG. 22, there is shown a flowchart of a method performed by an apparatus, such as apparatus 10 illustrated in FIG. 1, according to an exemplary embodiment. In S2201, the apparatus receives image data of a barcode. An example of a linear, one-dimensional barcode is illustrated in FIG. 4A, and an example of a matrix type, two-dimensional barcodes is illustrated in FIG. 4B. The apparatus may receive the image data of the barcode by receiving the image data as an electronic data transmission from a data network, or by using a scanner, reader or camera to scan, read or take an electronic photograph of the barcode. In S2202, the apparatus processes the image data to decode a barcode data/URL encoded in the barcode. Finally, in S2203, the apparatus generates a destination URL by processing the barcode data/URL based on a current time or time value or time period. The apparatus may also automatically input the destination URL into a browser, although this is optional.

Turning now to FIGS. 23-26, there is described another exemplary embodiment of this disclosure.

According to this exemplary embodiment, barcode data/URLs are processed based, at least in part, on a current location of the apparatus 10 or 20, or based on a current location of the user of the apparatus. As used herein, the term 'location' refers to any representation of a physical, geographic, or spatial position of the apparatus (or user). For example, the location may be a set of coordinates, a latitude and longitude, the identification of an address, the identification of a street, suburb, district, city, state, country, etc. The location may also refer to a branch, outlet or office of an enterprise or organization.

For example, FIG. 23 illustrates an example of user destination information similar to the user destination information of FIG. 11. The user destination information of FIG. 11 indicates, for a given type of barcode data, a corresponding destination URL for one or more different users. In contrast, the user destination information of FIG. 23 further indicates, for a given type of barcode data, a corresponding destination URL for one or more users depending on a location of the user or the apparatus of the user. That is, if the barcode data is the information "XYZ Corporation Shirt Products" and the user is "John Smith", then the destination URL if the user John Smith is at the midtown store is "www.xyz.com/mens/shirts/midtown", and the destination URL if the user John Smith is at the downtown store is "www.xyz.com/mens/shirts/downtown", and the destination URL if the user John Smith is at the suburban store is "www.xyz.com/mens/shirts/suburban". Thus, the processing part 10c of the apparatus 10 may generate a destination URL, based on one or more of (i) a given piece of barcode data, (ii) a specific user of the apparatus, (iii) a specific time value or time period and (iv) a specific location of the user or apparatus, by referring to the user destination information of FIG. 19 and/or FIG. 23.

As another example, FIG. 24 illustrates an example of role-specific destination information similar to the role-specific destination information of FIG. 16. The role-specific destination information of FIG. 16 indicates, for a given type of barcode data, a corresponding destination URL for one or more different possible user roles. In contrast, the role-specific destination information of FIG. 24 further indicates, for a given type of barcode data/URL, a corresponding destination URL for one or more user roles depending on different locations of the user or the user's apparatus. That is, if the barcode data is the information "xyz.com/001" and the user role is "User Role 4", then the destination URL if the user or apparatus is located at City A, Country 1 is "xyz.com/401/cityAcountry1", and the destination URL if the user or apparatus is located at City B, Country 1 is "xyz.com/401/cityBcountry1", and the destination URL if the user or apparatus is located at City M, Country 2 is "xyz.com/401/cityMcountry2". Thus, the processing part 10c of the apparatus 10 may generate a destination URL, based on one or more of (i) a given piece of barcode data, (ii) a specific user role of a user of the apparatus, (iii) a specific time value or time period, and (iv) a specific location of the user or apparatus, by referring to the role-specific destination information of FIG. 20 and/or FIG. 24.

The different URLs in this embodiment may allow users to access different websites (or different portions of the same website) with features/information specifically tailored to a particular location. For example, referring to the role-specific destination information of FIG. 20, since the user role 4 corresponds to a stock person user, the destination URL for city A, country 1 may contain features/information specifically tailored to the type of goods stocked in retail outlets in country 1, whereas the destination URL for city M, country 2 may contain features/information specifically tailored to the type of goods stocked in retail outlets in country 2.

While the information of FIGS. 23 and 24 illustrates how barcode information encoded in a barcode may be processed based on both (a) an identity/role of a user and (b) a location of the user and/or apparatus, it should be understood that the barcode information encoded in the barcode may be processed based on the location of the user and/or apparatus alone, without taking into consideration the identity/role of the user. For example, the location destination information of FIG. 25 indicates, for a given type of barcode data, a corresponding destination URL for one or more locations of the user or the apparatus. That is, if the barcode data is the information "XYZ Corporation Shirt Products" and the location of the user or apparatus is the midtown store, then the destination URL is "www.xyz.com/mens/shirts/midtown", whereas if the barcode data is the information "XYZ Corporation Shirt Products" and the location of the user or apparatus is the downtown store, then the destination URL is "www.xyz.com/mens/shirts/downtown", whereas if the barcode data is the information "XYZ Corporation Shirt Products" and the location of the user or apparatus is the suburban store, then the destination URL is "www.xyz.com/mens/shirts/suburban". Thus, the processing part 10c of the apparatus 10 may generate a destination URL, based on a given piece of barcode data and a specific location of the user or apparatus, by referring to the location destination information of FIG. 25.

While the examples described above refer to the generation of a content identifier corresponding to a destination URL, it should be understood the that barcode data encoded in the barcode and the user destination information, role-specific destination information and/or location destination information may include various other types of information, and that the processing part may utilize this information in order to generate different types of content and/or content identifiers. For example, instead of generating a destination URL, the processing part may process the barcode data based on the user destination information, role-specific destination information and/or location destination information, to generate a phone number, an SMS/text address or number, video data, coupon information, a Facebook™ page, contact information, a calendar entry, text or string information, directions, or some other content or identifier of content that is generated by processing the barcode data and is specifically tailored to the location of the user or the apparatus.

The apparatus 10 or 20 may generate location information indicating a current location of the apparatus (or a current location of the user of the apparatus) in a number of ways. As one example, the apparatus 10 or 20 may include a built-in global positioning system (GPS) to determine the spatial coordinates of the apparatus, which can be compared to the spatial coordinates of known locations (such as the coordinates of a particular office, branch, building, street, city, state, country, etc.) in order to determine the present location of the device. As another example, different branches or offices of an enterprise organization may include RFID tags positioned at predetermined locations, and the apparatus 10 or 20 may include an RFID reader, and the apparatus determines its location based on sensor readings of the RFID tags generated by the RFID reader. For example, if an RFID tag is located at a first predetermined location and the RFID reader in the device can detect the RFID tag, then the apparatus may be considered to be located at the first predetermined location.

In yet another example, the location information indicating a current location of the apparatus or user may be determined using a geolocation process, based on the Internet Protocol (IP) address of the apparatus 10 or 20 and/or other IP information of the network to which the apparatus is connected. An IP address is a numerical label (typically a 32-bit number) assigned to a device participating in a computer network to identify that device in the computer network, and while IP addresses do not directly correspond to geographic locations, the approximate geographic location of a device may be determined based on the IP address of the device. In the geolocation process, IP addresses are mapped to geographic locations using large computer databases. Access to several geolocation databases is available for free via the internet, whereas access to other geolocation databases is available for a fee. As one simple example of the aforementioned geolocation process, an IP address of the apparatus may be determined and converted into an IP number, and the IP number may be accessed in an IP-country database in order to determine the country in which the apparatus and the user are located. For example, the IP Address 202.186.13.4 may be converted to IP Number 3401190660, and in an IP-country database the IP Number 3401190660 may be positioned between a specific range of IP numbers, such as "3401056256" through "3401400319", corresponding to the country "Malaysia". Thus, based on the IP address of the apparatus, a geolocation procedure may be used to determine the location of the user and the apparatus. While the location of the apparatus is determined as being in a particular country (such as Malaysia) in the example above, the determined location may be associated with other broad geographic areas, such as regions, cities, ZIP codes, etc., based on the specificity of the particular geolocation database being used. The apparatus 10 or 20 may generate location information indicating the current location of the apparatus or the user of the apparatus using other techniques, as understood by those skilled in the art.

Figure 26:
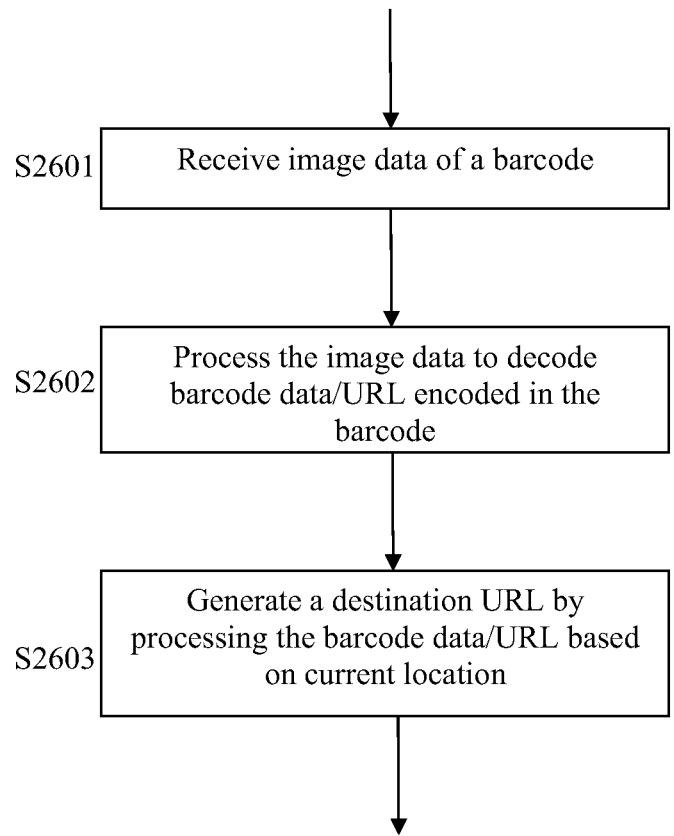
FIG. 26 shows a flowchart of a method performed by an apparatus, such as apparatus 10 illustrated in FIG. 1, according to an exemplary embodiment.

Turning now to FIG. 26, there is shown a flowchart of a method performed by an apparatus, such as apparatus 10 illustrated in FIG. 1, according to an exemplary embodiment.

In S2601, the apparatus receives image data of a barcode. An example of a linear, one-dimensional barcode is illustrated in FIG. 4A, and an example of a matrix type, two-dimensional barcodes is illustrated in FIG. 4B. The apparatus may receive the image data of the barcode by receiving the image data as an electronic data transmission from a data network, or by using a scanner, reader or camera to scan, read or take an electronic photograph of the barcode. In S2602, the apparatus processes the image data to decode a barcode data/ URL encoded in the barcode. Finally, in S2603, the apparatus generates a destination URL by processing the barcode data/ URL based on a current location of a user or apparatus. The apparatus may also automatically input the destination URL into a browser, although this step is optional.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. An apparatus for decoding information encoded in symbolic marks, said apparatus comprising:
an authentication part configured to receive user authentication information corresponding to a specific user of the apparatus, and to authenticate said user authentication information;
an input part configured to receive image data of a barcode; and
a processing part configured to process the image data to decode barcode data encoded in the barcode, generate a destination URL by processing the barcode data, and modify the destination URL by appending additional information to the destination URL, said additional information having been determined based on user identity and role from the user authentication information corresponding to the specific user of the apparatus, and automatically input the modified destination URL into a browser.

2. The apparatus of claim 1 wherein the barcode data includes a barcode URL, and the processing part generates the destination URL by modifying the barcode URL, based on the user authentication information.

3. The apparatus of claim 1, wherein a storage part of the apparatus stores user destination information indicating, for each of plural types of barcode data, a destination URL corresponding to each user of the apparatus, and
the processing part generates the destination URL based on the user destination information.

4. The apparatus of claim 3, wherein for a first type of barcode data in the user destination information, a first destination URL corresponds to a first user and a second destination URL corresponds to the second user.

5. The apparatus of claim 1, wherein a storage part of the apparatus stores user rale information identifying a plurality of users and a corresponding plurality of user roles.

6. The apparatus of claim 5, wherein the processing part processes the barcode data based on the user role corresponding to the specific user of the apparatus.

7. A system for decoding information encoded in symbolic marks, said system comprising:
an apparatus including:
an authentication part configured to receive user authentication information corresponding to a specific user of the apparatus, and to authenticate said user authentication information; and
an input part configured to receive image data of barcode; and
a hosted server including:
a processing part configured to process the image data to decode barcode data encoded in the barcode, generate a destination URL by processing the barcode data, and modify the destination URL by appending additional information to the destination URL, said additional information having been determined based on user identity and role from the user authentication information corresponding to the specific user of the apparatus, and automatically input the modified destination URL into a browser.

8. The system of claim 7, wherein the barcode data includes a barcode URL, and the processing part generates the destination URL by modifying the barcode URL, based on the user authentication information.

9. The system of claim 7, wherein a storage part of the hosted server stores user destination information indicating, for each of plural types of barcode data, a destination URL corresponding to each user of the apparatus, and
the processing part generates the destination URL based on the user destination information.

10. The system of claim 9, wherein for a first type of barcode data in the user destination information, a first destination URL corresponds to a first user and a second destination URL corresponds to the second user.

11. The system of claim 7, wherein a storage part of the hosted server stores user role information identifying a plurality of users and a corresponding plurality of user roles.

12. The system of claim 11, wherein the processing part processes the barcode data based on the user role corresponding to the specific user of the apparatus.

13. A method for decoding information encoded in symbolic marks, said method comprising:
receiving user authentication information corresponding to a specific user of an apparatus, and authenticating said user authentication information;
receiving image data of a barcode;
processing the image data to decode barcode data encoded in the barcode; and
generating a destination URL by processing the barcode data, and modifying the destination URL by appending additional information to the destination URL, said additional information having been determined based on user identity and role from the user authentication information corresponding to the specific user of the apparatus, and automatically inputting the modified destination URB into a browser.

14. The method of claim 13, wherein the barcode data includes a barcode URL, and the destination URL is generated by modifying the barcode URL, based on the user authentication information.

15. The method of claim 13, further comprising:
storing user destination information indicating, for each of plural types of barcode data, a destination URL corresponding to each user of the apparatus, and
generating the destination URL based on the user destination information.

16. The method of claim 13, further comprising storing user role information identifying a plurality of users and a corresponding plurality of user roles.

17. The method of claim 16, processing the barcode data based on the user role corresponding to the specific user of the apparatus.

18. The method of claim 13, wherein the barcode data includes a barcode URL, and the destination URL is generated by modifying the barcode URL, based on a current time value.

19. The method of claim 13, wherein the barcode data includes a barcode URL, and the destination URL is generated by modifying the barcode URL, based on a current detected location of the user.

20. A non-transitory computer readable medium tangibly embodying a series of instructions that, when executed by a processor of an apparatus, cause the apparatus to perform a method for decoding information encoded in symbolic marks, said method comprising:
receiving image data of a barcode;
processing the image data to decode barcode data encoded in the barcode; and generating a destination URL by processing the barcode data, and modifying the destination URL, by appending additional information to the destination URL, said additional information having been determined based on user identity and role from the user authentication information, a current time value or a current geographical location, and automatically inputting the modified destination URL into a browser.

* * * * *